(12) United States Patent
Lyu et al.

(10) Patent No.: US 11,927,727 B2
(45) Date of Patent: Mar. 12, 2024

(54) OPTICAL IMAGING LENS ASSEMBLY

(71) Applicant: Zhejiang Sunny Optical Co., Ltd, Ningbo (CN)

(72) Inventors: Saifeng Lyu, Ningbo (CN); Tianxiang Xing, Ningbo (CN)

(73) Assignee: Zhejiang Sunny Optical Co., Ltd (CN)

( * ) Notice: Subject to any disclaimer, the term of this patent is extended or adjusted under 35 U.S.C. 154(b) by 736 days.

(21) Appl. No.: 17/028,441

(22) Filed: Sep. 22, 2020

(65) Prior Publication Data

US 2021/0003828 A1 Jan. 7, 2021

Related U.S. Application Data

(63) Continuation of application No. PCT/CN2019/099394, filed on Aug. 6, 2019.

(30) Foreign Application Priority Data

Dec. 13, 2018 (CN) .......................... 201811524044.9

(51) Int. Cl.
*G02B 9/62* (2006.01)
*G02B 13/00* (2006.01)

(52) U.S. Cl.
CPC ........... *G02B 13/0045* (2013.01); *G02B 9/62* (2013.01)

(58) Field of Classification Search
CPC .. G02B 13/0045; G02B 13/0015; G02B 9/00; G02B 9/62
USPC ........................................................ 359/756
See application file for complete search history.

(56) References Cited

U.S. PATENT DOCUMENTS

| 8,908,290 B1* | 12/2014 | Liao | .................... G02B 13/0045 |
| | | | 359/715 |
| RE46,711 E * | 2/2018 | Tsai | ....................... G02B 13/18 |
| 2013/0033762 A1* | 2/2013 | Tsai | .................... G02B 13/0045 |
| | | | 359/713 |

(Continued)

FOREIGN PATENT DOCUMENTS

| CN | 202067015 U | 12/2011 |
| CN | 202217102 U | 5/2012 |

(Continued)

OTHER PUBLICATIONS

International Search Report for PCT/CN2019/099394, 5 pages.

(Continued)

*Primary Examiner* — William R Alexander
(74) *Attorney, Agent, or Firm* — Barnes & Thornburg LLP

(57) ABSTRACT

The present disclosure discloses an optical imaging lens assembly including, sequentially from an object side to an image side along an optical axis, a first lens, a second lens, a third lens, a fourth lens, a fifth lens and a sixth lens having refractive power. An object-side surface of the first lens is convex, and an image-side surface of the first lens is concave; an image-side surface of the second lens is concave; and an object-side surface of the sixth lens is convex. An effective focal length f1 of the first lens and an effective focal length f5 of the fifth lens satisfy 1≤f5/f1≤3.5. A distance TTL along the optical axis from the object-side surface of the first lens to an imaging plane and half of a diagonal length ImgH of an effective pixel area on the imaging plane satisfy TTL/ImgH≤1.3.

19 Claims, 14 Drawing Sheets

(56) References Cited

U.S. PATENT DOCUMENTS

| | | | |
|---|---|---|---|
| 2013/0070346 A1* | 3/2013 | Hsu | G02B 13/0045 |
| | | | 359/713 |
| 2013/0235473 A1* | 9/2013 | Chen | G02B 13/0045 |
| | | | 359/713 |
| 2014/0092491 A1* | 4/2014 | Hsu | G02B 13/0045 |
| | | | 359/761 |
| 2015/0085379 A1* | 3/2015 | Tang | G02B 9/62 |
| | | | 359/713 |
| 2015/0153546 A1 | 6/2015 | Tang et al. | |
| 2019/0121063 A1* | 4/2019 | Li | G02B 9/62 |
| 2019/0154967 A1* | 5/2019 | Son | G02B 13/0045 |
| 2019/0353879 A1* | 11/2019 | Tang | G02B 13/18 |

FOREIGN PATENT DOCUMENTS

| | | |
|---|---|---|
| CN | 202256844 U | 5/2012 |
| CN | 202256850 U | 5/2012 |
| CN | 203759347 U | 8/2014 |
| CN | 104122651 A | 10/2014 |
| CN | 104932084 A | 9/2015 |
| CN | 107703608 A | 2/2016 |
| CN | 105445915 A | 3/2016 |
| CN | 105607229 A | 5/2016 |
| CN | 106772931 A | 5/2017 |
| CN | 106802468 A | 6/2017 |
| CN | 107003501 A | 8/2017 |
| CN | 107132638 A | 9/2017 |
| CN | 107153257 A | 9/2017 |
| CN | 107367827 A | 11/2017 |
| CN | 107367872 A | 11/2017 |
| CN | 107436477 A | 12/2017 |
| CN | 107643586 A | 1/2018 |
| CN | 107703605 A | 2/2018 |
| CN | 107817573 A | 3/2018 |
| CN | 107817574 A | 3/2018 |
| CN | 108983399 A | 12/2018 |
| CN | 109343204 A | 2/2019 |
| JP | 2008292800 A | 12/2008 |
| JP | 6374082 B1 | 8/2018 |
| WO | 2015005417 A1 | 1/2015 |

OTHER PUBLICATIONS

First Chinese Office Action for CN202010174077.6, dated Jun. 11, 2021, 17 pages.

Second Chinese Office Action for CN202010174077.6, dated Jul. 30, 2021, 12 pages.

India Intellectual Property Office for Application No. 202017042923, dated Aug. 6, 2021, 5 pages.

* cited by examiner

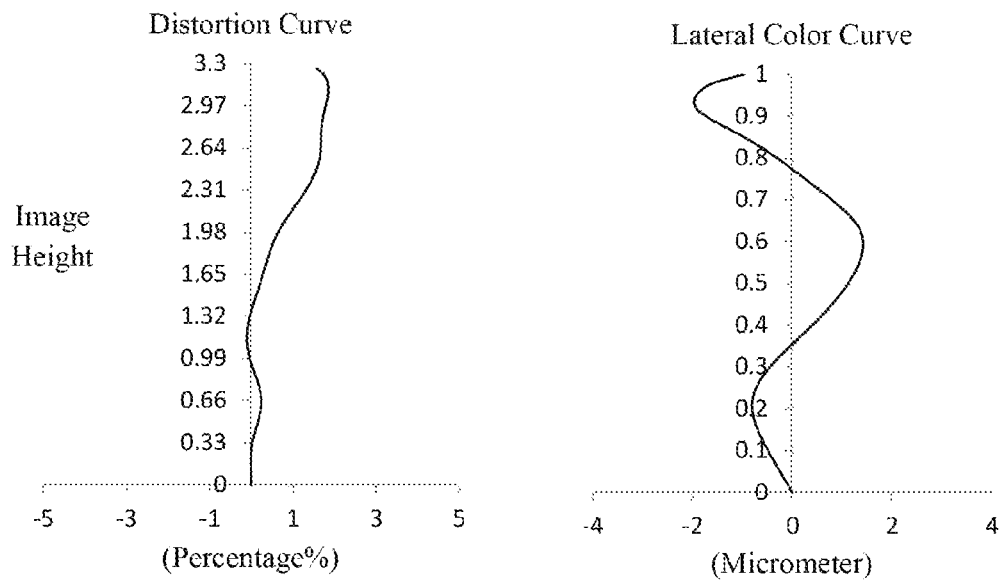
Fig. 2C
Fig. 2D
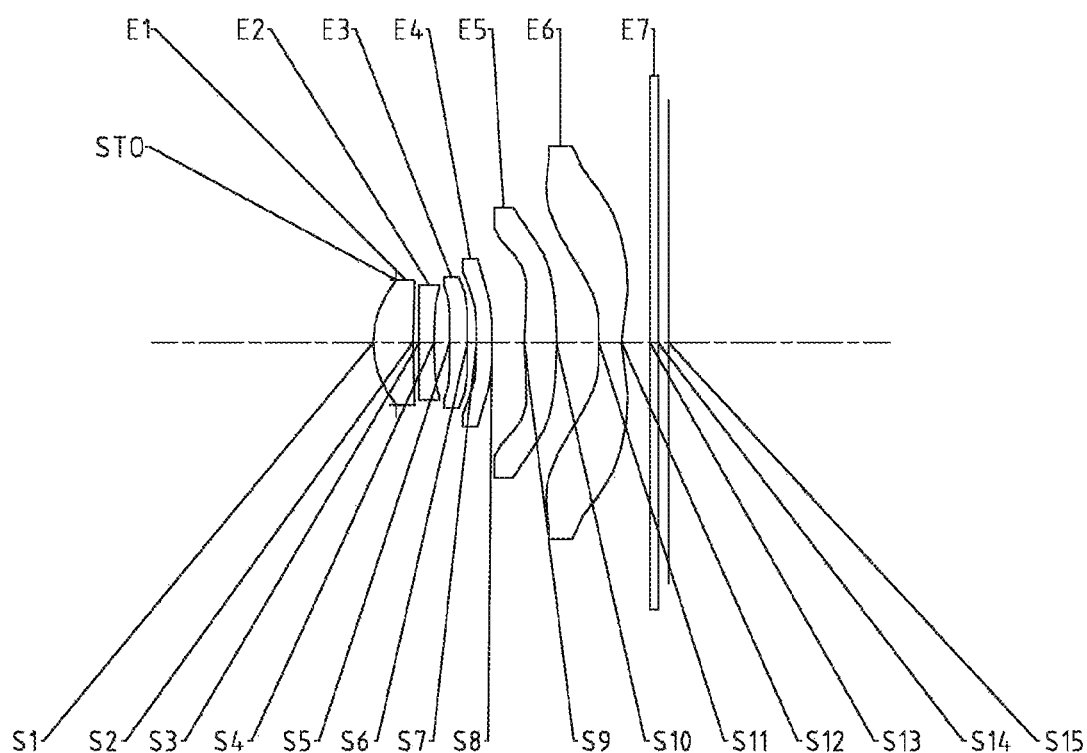
Fig. 3

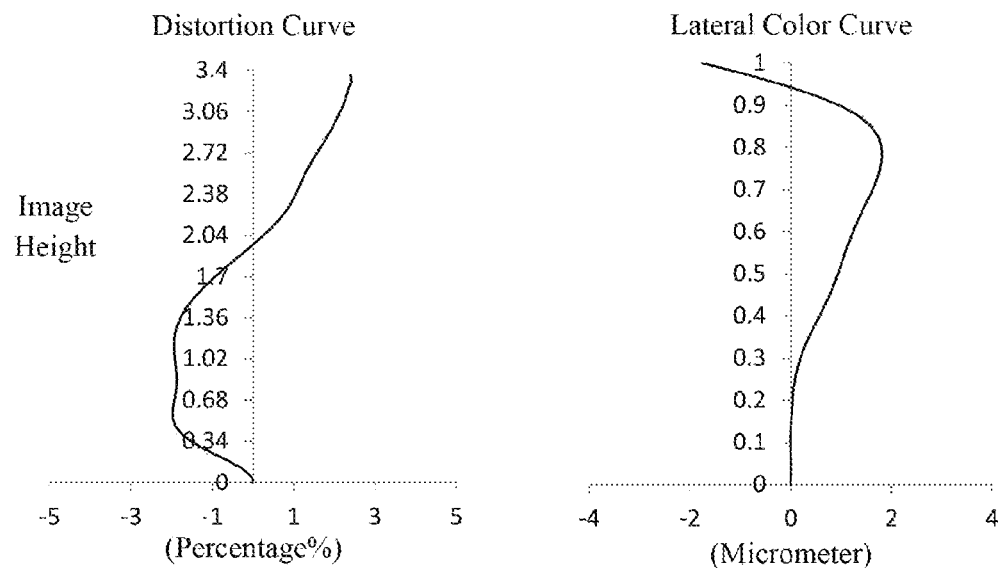
Fig. 10C
Fig. 10D
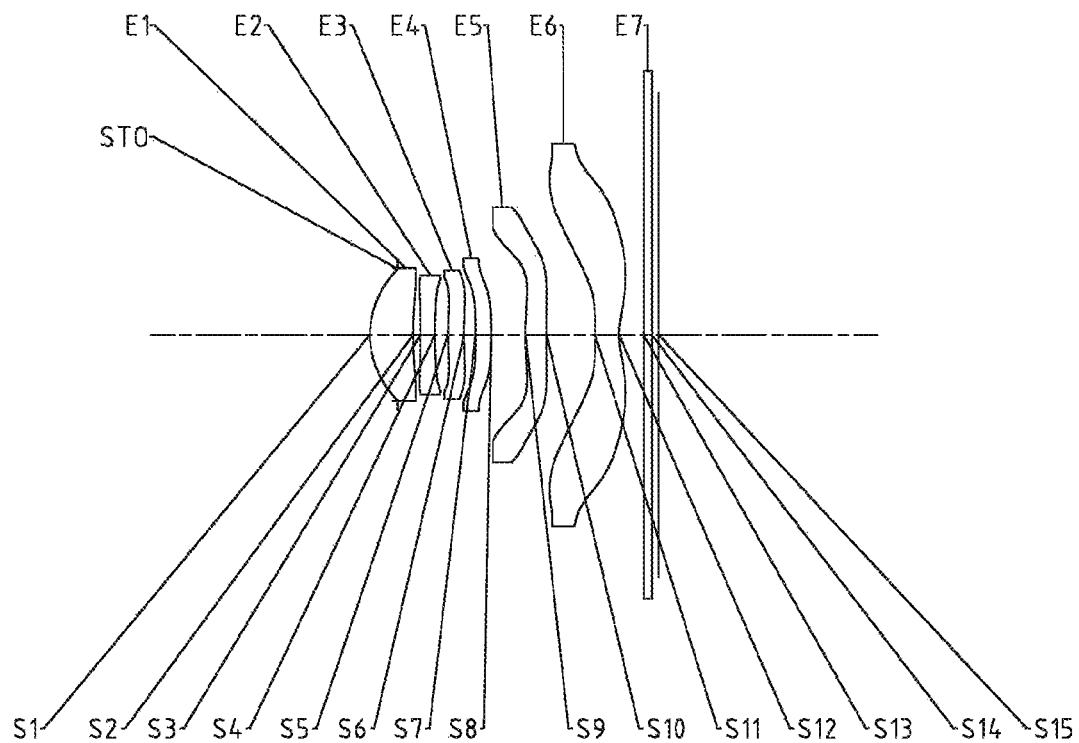
Fig. 11

OPTICAL IMAGING LENS ASSEMBLY

CROSS-REFERENCE TO RELATED APPLICATIONS

The present patent application is a continuation of International Application No. PCT/CN2019/099394, filed on Aug. 6, 2019, which claims priority to Chinese Patent Application No. 201811524044.9, filed before the China National Intellectual Property Administration (CNIPA) on Dec. 13, 2018. Both of the aforementioned patent applications are hereby incorporated by reference in their entireties.

TECHNICAL FIELD

The present disclosure relates to an optical imaging lens assembly, and more specifically, relates to an optical imaging lens assembly including six lenses.

BACKGROUND

With the development of science and technology, portable electronic products have gradually emerged, and the portable electronic products with camera functions have been more favored by people. Therefore, the market's demand for the imaging lens assembly suitable for the portable electronic products has gradually increased. On the one hand, as the portable electronic products, such as smart phones, tend to be miniaturized, the total length of the lens assembly is limited, thereby increasing the design difficulty of lens assembly. On the other hand, as the performance of common photosensitive elements, such as Charge-Coupled Device (CCD) or Complementary Metal-Oxide Semiconductor (CMOS), increases and the size thereof reduces, the number of pixels of the photosensitive component increases and the size of the pixel decreases, which puts forward higher requirements for the high imaging quality and miniaturization of the applied imaging lens assembly.

In order to meet the requirements of miniaturization, the aperture number (F number) of the existing lens assemblies is usually 2.0 or above to achieve both miniaturization and good optical performance. However, with the continuous development of the portable electronic products, such as smart phones, higher requirements are put forward for the aperture number of the applied camera lens assembly. Especially, in the case of insufficient light (such as rainy days, dusk, etc.), hand shake and the like, the lens assembly needs to have a relatively small aperture number.

SUMMARY

The present disclosure provides an optical imaging lens assembly that is applicable to portable electronic products and at least solves or partially solves at least one of the above disadvantages of the prior art.

The present disclosure provides an optical imaging lens assembly which includes, sequentially from an object side to an image side along an optical axis, a first lens, a second lens, a third lens, a fourth lens, a fifth lens and a sixth lens having refractive power. An object-side surface of the first lens may be a convex surface, and an image-side surface thereof may be a concave surface; an image-side surface of the second lens may be a concave surface; and an object-side surface of the sixth lens may be a convex surface.

In one embodiment, an effective focal length f1 of the first lens and an effective focal length f5 of the fifth lens may satisfy $1 \leq f5/f1 \leq 3.5$.

In one embodiment, a distance TTL along the optical axis from the object-side surface of the first lens to an imaging plane of the optical imaging lens assembly and half of a diagonal length ImgH of an effective pixel area on the imaging plane of the optical imaging lens assembly may satisfy $TTL/ImgH \leq 1.3$.

In one embodiment, a radius of curvature R2 of the image-side surface of the first lens, a radius of curvature R1 of the object-side surface of the first lens and a total effective focal length f of the optical imaging lens assembly may satisfy $0.6 < (R2-R1)/f < 1.1$.

In one embodiment, a radius of curvature R4 of the image-side surface of the second lens and an effective focal length f2 of the second lens may satisfy $-2.2 < R4/f2 < -0.3$.

In one embodiment, an effective focal length f6 of the sixth lens, a center thickness CT5 of the fifth lens along the optical axis, a spaced interval T56 between the fifth lens and the sixth lens along the optical axis and a center thickness CT6 of the sixth lens along the optical axis may satisfy $1.4 < |f6|/(CT5+T56+CT6) < 2.4$.

In one embodiment, a center thickness CT1 of the first lens along the optical axis, a center thickness CT2 of the second lens along the optical axis and a spaced interval T23 between the second lens and the third lens along the optical axis may satisfy $0.8 < CT1/(CT2+T23) < 1.8$.

In one embodiment, a maximum effective radius DT32 of an image-side surface of the third lens and a maximum effective radius DT12 of the image-side surface of the first lens may satisfy $0.8 < DT32/DT12 < 1.3$.

In one embodiment, a maximum effective radius DT11 of the object-side surface of the first lens, a maximum effective radius DT61 of the object-side surface of the sixth lens and half of a diagonal length ImgH of an effective pixel area on an imaging plane of the optical imaging lens assembly may satisfy $0.8 < (DT11+DT61)/ImgH < 1.2$.

In one embodiment, a total effective focal length f of the optical imaging lens assembly, an effective focal length f3 of the third lens and an effective focal length f4 of the fourth lens may satisfy $0 < f/|f3+f4| < 0.5$.

In one embodiment, a radius of curvature R11 of the object-side surface of the sixth lens and a radius of curvature R12 of an image-side surface of the sixth lens may satisfy $0.9 < (R11+R12)/(R11-R12) < 1.4$.

In one embodiment, a center thickness CT5 of the fifth lens along the optical axis and an edge thickness ET5 of the fifth lens may satisfy $1.1 < CT5/ET5 < 2.3$.

In one embodiment, a radius of curvature R7 of an object-side surface of the fourth lens and a radius of curvature R9 of an object-side surface of the fifth lens may satisfy $0 < (R7+R9)/(R7-R9) < 1$.

In one embodiment, half of a diagonal length ImgH of an effective pixel area on an imaging plane of the optical imaging lens assembly and a total effective focal length f of the optical imaging lens assembly may satisfy $0.7 < ImgH/f < 1.1$.

The present disclosure employs six lenses, and the above optical imaging lens assembly has at least one beneficial effect, such as miniaturization, ultra-thin, large aperture, high image quality, and large image plane and the like, by rationally configuring the refractive power, the surface shape, the center thickness of each lens, and the on-axis spaced interval between the lenses and the like.

BRIEF DESCRIPTION OF THE DRAWINGS

Other features, objects, and advantages of the present disclosure will become more apparent from the following detailed description of the non-limiting embodiments with reference to the accompanying drawings. In the drawings:

FIGS. 2A to 2D illustrate a longitudinal aberration curve, an astigmatic curve, a distortion curve, and a lateral color curve of the optical imaging lens assembly of the example 1, respectively.

FIG. 3 illustrates a schematic structural view of an optical imaging lens assembly according to example 2 of the present disclosure.

FIGS. 10A to 10D illustrate a longitudinal aberration curve, an astigmatic curve, a distortion curve, and a lateral color curve of the optical imaging lens assembly of the example 5, respectively.

FIG. 11 illustrates a schematic structural view of an optical imaging lens assembly according to example 6 of the present disclosure.

DETAILED DESCRIPTION OF EMBODIMENTS

Figure 1:
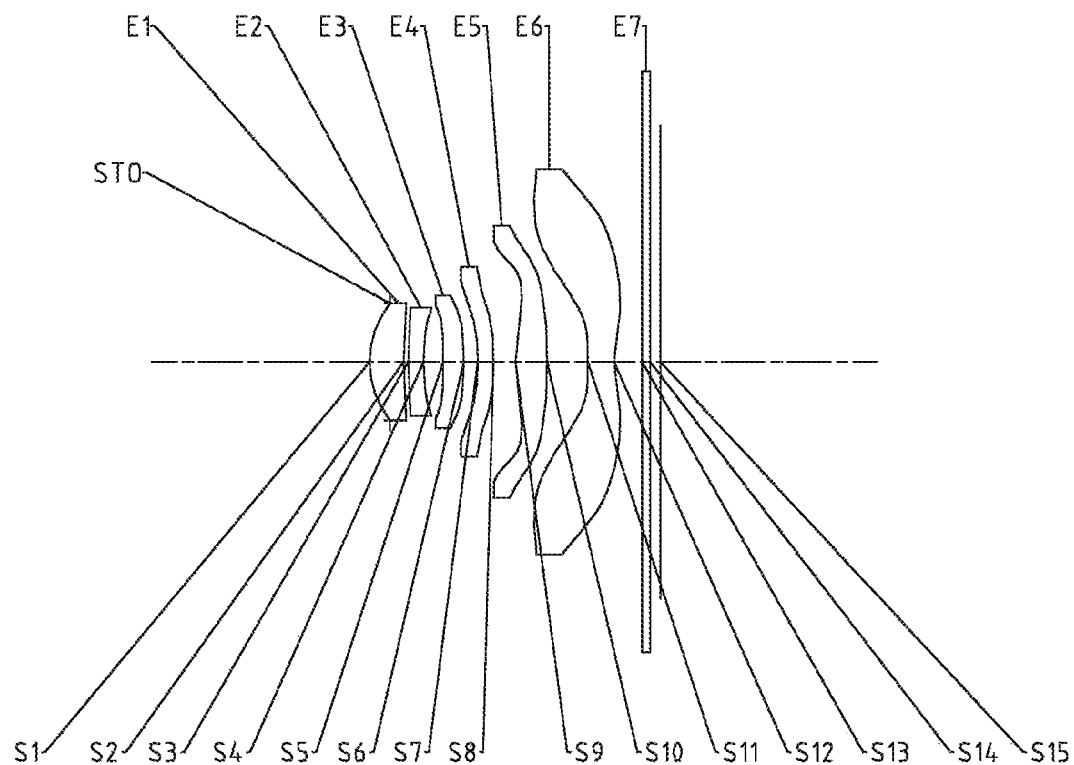
FIG. 1 illustrates a schematic structural view of an optical imaging lens assembly according to example 1 of the present disclosure.

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been somewhat exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is a convex surface and the position of the convex is not defined, it indicates that the surface of the lens is convex at least in the paraxial region; and if a surface of a lens is a concave surface and the position of the concave is not defined, it indicates that the surface of the lens is concave at least in the paraxial region. In each lens, the surface closest to the object is referred to as an object-side surface of the lens, and the surface closest to the imaging plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

An optical imaging lens assembly according to an exemplary embodiment of the present disclosure may include, for example, six lenses (i.e. a first lens, a second lens, a third lens, a fourth lens, a fifth lens and a sixth lens) having refractive power. The six lenses are arranged sequentially from an object side to an image side along an optical axis. Among the first lens to the sixth lens, there may be an air interval between each two adjacent lenses.

In an exemplary embodiment, an object-side surface of the first lens may be a convex surface, and an image-side surface thereof may be a concave surface; an image-side surface of the second lens may be a concave surface; and an object-side surface of the sixth lens may be a convex surface.

In an exemplary embodiment, the optical imaging lens assembly according to the present disclosure may satisfy: TTL/ImgH≤1.3, where TTL is a distance along the optical axis from the object-side surface of the first lens to an imaging plane of the optical imaging lens assembly, and ImgH is half of a diagonal length of an effective pixel area on the imaging plane of the optical imaging lens assembly. More specifically, TTL and ImgH may further satisfy: 1.14≤TTL/ImgH≤1.24. When the conditional expression TTL/ImgH≤1.3 is satisfied, the size of the system may be effectively compressed to ensure the compact size characteristics of the lens assembly, and the size of the imaging plane may be increased reasonably. The image quality is ensured while taking into account both ultra-thin and large image plane.

In an exemplary embodiment, the optical imaging lens assembly according to the present disclosure may satisfy: 1≤f5/f1≤3.5, where f5 is an effective focal length of the fifth lens, and f1 is an effective focal length of the first lens. More specifically, f5 and f1 may further satisfy: 1.04≤f5/f1≤3.50. By reasonably distributing the effective focal lengths of the first lens and the fifth lens, the deflection angle of the light may be reduced, and the tolerance sensitivity of the first lens may be reduced, thereby improving the image quality of the optical system. Optionally, the first lens has positive refractive power, and the fifth lens has positive refractive power.

In an exemplary embodiment, the optical imaging lens assembly according to the present disclosure may satisfy: 0.6<(R2−R1)/f<1.1, where R2 is a radius of curvature of the image-side surface of the first lens, R1 is a radius of curvature of the object-side surface of the first lens, and f is a total effective focal length of the optical imaging lens assembly. More specifically, R2, R1 and f may further satisfy: 0.71≤(R2−R1)/f≤1.02. By controlling the ratio of the difference between the radius of curvature of the image-side surface of the first lens and the radius of curvature of the object-side surface of the first lens to the total effective focal length of the system to be within a certain range, the radius of curvature of the first lens may be controlled within a reasonable range, thereby reducing the sensitivity of the first lens.

In an exemplary embodiment, the optical imaging lens assembly according to the present disclosure may satisfy: −2.2<R4/f2<−0.3, where R4 is a radius of curvature of the image-side surface of the second lens, and f2 is an effective focal length of the second lens. More specifically, R4 and f2 may further satisfy: −2.15≤R4/f2≤−0.35. By reasonably controlling the ratio of the effective focal length of the second lens to the radius of curvature of the image-side surface of the second lens, the deflection angle of the edge light at the second lens may be controlled, and the sensitivity of the lens system may be effectively reduced. At the same time, the inclination angle at the edge of the image-side surface of the second lens may be reduced to eliminate the risk of ghost images here. Optionally, the second lens has negative refractive power.

In an exemplary embodiment, the optical imaging lens assembly according to the present disclosure may satisfy: 1.4<|f6|/(CT5+T56+CT6)<2.4, where f6 is an effective focal length of the sixth lens, CT5 is a center thickness of the fifth lens along the optical axis, T56 is a spaced interval between the fifth lens and the sixth lens along the optical axis, and CT6 is a center thickness of the sixth lens along the optical axis. More specifically, f6, CT5, T56 and CT6 may further satisfy: 1.64≤|f6|/(CT5+T56+CT6)≤2.23. When the conditional expression 1.4<|f6|/(CT5+T56+CT6)<2.4 is satisfied, the fifth lens and the sixth lens may be used to correct the field curvature and astigmatic on the basis of ensuring that the fifth lens and the sixth lens have a reasonable structure. Optionally, the sixth lens has negative refractive power.

In an exemplary embodiment, the optical imaging lens assembly according to the present disclosure may satisfy: 0.7<ImgH/f<1.1, where ImgH is half of a diagonal length of an effective pixel area on an imaging plane of the optical imaging lens assembly, and f is a total effective focal length of the optical imaging lens assembly. More specifically, ImgH and f may further satisfy: 0.89≤ImgH/f≤0.99. When the conditional expression 0.7<ImgH/f<1.1 is satisfied, the size of the lens system may be effectively compressed to ensure the ultra-thin characteristics of the lens.

In an exemplary embodiment, the optical imaging lens assembly according to the present disclosure may satisfy: 0.8<CT1/(CT2+T23)<1.8, where CT1 is a center thickness of the first lens along the optical axis, CT2 is a center thickness of the second lens along the optical axis, and T23 is a spaced interval between the second lens and the third lens along the optical axis. More specifically, CT1, CT2, and T23 may further satisfy: 0.98≤CT1/(CT2+T23)≤1.62. By reasonably distributing the center thicknesses of the first lens and the second lens, and the air interval between the second lens and the third lens, the lens assembly may have a better ability to compensate aberrations while ensuring good workability.

In an exemplary embodiment, the optical imaging lens assembly according to the present disclosure may satisfy: 0.8<DT32/DT12<1.3, where DT32 is a maximum effective radius of an image-side surface of the third lens, and DT12 is a maximum effective radius of the image-side surface of the first lens. More specifically, DT32 and DT12 may further satisfy: 1.04≤DT32/DT12≤1.20. By reasonably controlling the maximum effective radii of the first lens and the third lens, the size of the front end of the lens assembly may be reduced to achieve the effect of a small front end. When the imaging lens assembly is used as a front camera in a mobile phone, the screen-to-body ratio of the mobile phone can be increased.

In an exemplary embodiment, the optical imaging lens assembly according to the present disclosure may satisfy: 0.8<(DT11+DT61)/ImgH<1.2, where DT11 is a maximum effective radius of the object-side surface of the first lens, DT61 is a maximum effective radius of the object-side surface of the sixth lens, and ImgH is half of a diagonal length of an effective pixel area on an imaging plane of the optical imaging lens assembly. More specifically, DT11, DT61 and ImgH may further satisfy: 0.98≤(DT11+DT61)/ImgH≤1.04. By reasonably controlling the maximum effective radius of the first lens and the sixth lens, the size of the lens assembly is reduced while ensuring the characteristics of the large image plane of the optical system.

In an exemplary embodiment, the optical imaging lens assembly according to the present disclosure may satisfy: $0<f/|f3+f4|<0.5$, where f is a total effective focal length of the optical imaging lens assembly, f3 is an effective focal length of the third lens, and f4 is an effective focal length of the fourth lens. More specifically, f, f3 and f4 may further satisfy: $0.01 \leq f/|f3+f4| \leq 0.32$. By reasonably assigning the refractive power of the third lens and the fourth lens, the aberrations of the system may be compensated, so that the optical system has a better ability to compensate field curvature.

In an exemplary embodiment, the optical imaging lens assembly according to the present disclosure may satisfy: $0.9<(R11+R12)/(R11-R12)<1.4$, where R11 is a radius of curvature of the object-side surface of the sixth lens, and R12 is a radius of curvature of an image-side surface of the sixth lens. More specifically, R11 and R12 may further satisfy: $1.07 \leq (R11+R12)/(R11-R12) \leq 1.27$. By reasonably configuring the radius of curvature of the sixth lens, the aberrations of the lens system may be compensated, thereby improving the image quality of the lens system. Optionally, the object-side surface of the sixth lens is a convex surface, and the image-side surface thereof is a concave surface.

In an exemplary embodiment, the optical imaging lens assembly according to the present disclosure may satisfy: $1.1<CT5/ET5<2.3$, where CT5 is a center thickness of the fifth lens along the optical axis, and ET5 is an edge thickness of the fifth lens. More specifically, CT5 and ET5 may further satisfy: $1.15 \leq CT5/ET5 \leq 2.20$. Reasonably restricting the ratio of the center thickness to the edge thickness of the fifth lens may ensure that the optical element has good workability and may ensure that the total length TTL of the lens system is within a certain appropriate range.

In an exemplary embodiment, the optical imaging lens assembly according to the present disclosure may satisfy: $0<(R7+R9)/(R7-R9)<1$, where R7 is a radius of curvature of an object-side surface of the fourth lens, and R9 is a radius of curvature of an object-side surface of the fifth lens. More specifically, R7 and R9 may further satisfy: $0.10 \leq (R7+R9)/(R7-R9) \leq 0.95$. By reasonably configuring the ratio of the radii of curvature of the fourth lens and the fifth lens, the deflection angle of the light may be reduced, and the aberrations of the lens system may be easily compensated, thereby improving the image quality of the lens system. Optionally, the object-side surface of the fourth lens is a concave surface, and the object-side surface of the fifth lens is a convex surface.

In an exemplary embodiment, the above optical imaging lens assembly may further include a stop to improve the image quality of the lens group. The stop may be disposed between the object side and the first lens.

Optionally, the above optical imaging lens assembly may further include an optical filter for correcting the color deviation and/or a protective glass for protecting the photosensitive element located on an imaging plane.

The optical imaging lens assembly according to the above embodiments of the present disclosure may employ a plurality of lenses, such as six lenses as described above. By properly configuring the refractive power of each lens, the surface shape, the center thickness of each lens, and spaced intervals along the optical axis between the lenses, the size and the sensitivity of the lens assembly may be effectively reduced, and the workability of the lens assembly may be improved, such that the optical imaging lens assembly is more advantageous for production processing and may be applied to portable electronic products. The optical imaging lens assembly configured as described above may also have beneficial effects such as ultra-thin, large aperture, high image quality, large image plane and the like.

In the embodiments of the present disclosure, at least one of the surfaces of lenses is aspheric, that is, at least one of the object-side surface and the image-side surface of each of the first lens, the second lens, the third lens, the fourth lens, the fifth lens, and the sixth lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With aspheric lens, the aberrations that occur during imaging may be eliminated as much as possible, and thus improving the image quality. Optionally, the object-side surface and the image-side surface of each of the first lens, the second lens, the third lens, the fourth lens, the fifth lens and the sixth lens are aspheric.

However, it will be understood by those skilled in the art that the number of lenses constituting the camera lens assembly may be varied to achieve the various results and advantages described in this specification without departing from the technical solution claimed by the present disclosure. For example, although the embodiment is described by taking six lenses as an example, the optical imaging lens assembly is not limited to include six lenses. The optical imaging lens assembly may also include other numbers of lenses if desired.

Some specific examples of an optical imaging lens assembly applicable to the above embodiment will be further described below with reference to the accompanying drawings.

EXAMPLE 1

An optical imaging lens assembly according to example 1 of the present disclosure is described below with reference to FIG. 1 to FIG. 2D. FIG. 1 shows a schematic structural view of the optical imaging lens assembly according to example 1 of the present disclosure.

As shown in FIG. 1, the optical imaging lens assembly according to an exemplary embodiment of the present disclosure includes a stop STO, a first lens E1, a second lens E2, a third lens E3, a fourth lens E4, a fifth lens E5, a sixth lens E6, an optical filter E7 and an imaging plane S15, which are sequentially arranged from an object side to an image side along an optical axis.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a concave surface, and an image-side surface S6 thereof is a convex surface. The fourth lens E4 has negative refractive power, an object-side surface S7 thereof is a concave surface, and an image-side surface S8 thereof is a concave surface. The fifth lens E5 has positive refractive power, an object-side surface S9 thereof is a convex surface, and an image-side surface S10 thereof is a convex surface. The sixth lens E6 has negative refractive power, an object-side surface S11 thereof is a convex surface, and an image-side surface S12 thereof is a concave surface. The optical filter E7 has an object-side surface S13 and an image-side surface S14. Light from an object sequentially passes through the respective surfaces S1 to S14 and is finally imaged on the imaging plane S15.

Table 1 shows surface type, radius of curvature, thickness, material and conic coefficient of each lens of the optical imaging lens assembly in example 1, wherein the units for the radius of curvature and the thickness are millimeter (mm).

TABLE 1

| Surface number | Surface type | Radius of curvature | Thickness | Material Refractive index | Abbe number | Conic coefficient |
|---|---|---|---|---|---|---|
| OBJ | Spherical | Infinite | Infinite | | | |
| STO | Spherical | Infinite | −0.2779 | | | |
| S1 | Aspheric | 1.3039 | 0.4675 | 1.55 | 56.1 | −0.2111 |
| S2 | Aspheric | 4.6974 | 0.0652 | | | 0.0000 |
| S3 | Aspheric | 7.0130 | 0.2100 | 1.68 | 19.2 | 0.0000 |
| S4 | Aspheric | 3.2621 | 0.2678 | | | 0.0000 |
| S5 | Aspheric | −92.7276 | 0.2846 | 1.55 | 56.1 | −14.5262 |
| S6 | Aspheric | −10.0439 | 0.1931 | | | 71.8091 |
| S7 | Aspheric | −7.5458 | 0.2143 | 1.68 | 19.2 | −40.4130 |
| S8 | Aspheric | 56.3500 | 0.3061 | | | 57.5710 |
| S9 | Aspheric | 2.0715 | 0.4323 | 1.55 | 56.1 | −17.0633 |
| S10 | Aspheric | −12.3456 | 0.5605 | | | 10.2609 |
| S11 | Aspheric | 30.1557 | 0.3597 | 1.55 | 56.1 | 85.9343 |
| S12 | Aspheric | 1.2261 | 0.3867 | | | −9.6875 |
| S13 | Spherical | Infinite | 0.1100 | 1.52 | 64.2 | |
| S14 | Spherical | Infinite | 0.1411 | | | |
| S15 | Spherical | Infinite | | | | |

As can be seen from Table 1, the object-side surface and the image-side surface of any one of the first lens E1 to the sixth lens E6 are aspheric. In this example, the surface shape x of each aspheric lens may be defined by using, but not limited to, the following aspheric formula:

$$x = \frac{ch^2}{1+\sqrt{1-(k+1)c^2h^2}} + \sum A_i h^i \quad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient (given in the above Table 1); Ai is a correction coefficient for the i-th order of the aspheric surface. Table 2 below shows high-order coefficients A4, A6, A8, A10, A12, A14, A16, A18 and A20 applicable to each aspheric surface S1 to S12 in example 1.

TABLE 2

| Surface number | A4 | A6 | A8 | A10 | A12 | A14 | A16 | A18 | A20 |
|---|---|---|---|---|---|---|---|---|---|
| S1 | 1.7009E−02 | 5.9590E−03 | 3.1797E−01 | −2.3032E+00 | 8.1443E+00 | −1.5576E+01 | 1.5357E+01 | −6.1898E+00 | 0.0000E+00 |
| S2 | −1.4095E−01 | 2.3808E−01 | −1.2464E+00 | 7.9930E+00 | −2.9254E+01 | 5.8422E+01 | −6.0081E+01 | 2.4732E+01 | 0.0000E+00 |
| S3 | −1.7975E−01 | 3.7864E−01 | −6.8362E−01 | 4.1069E+00 | −1.6353E+01 | 3.4268E+01 | −3.5444E+01 | 1.4171E+01 | 0.0000E+00 |
| S4 | −4.4810E−02 | 1.9261E−01 | 3.9410E−01 | −1.4613E+00 | 1.9074E+00 | −4.1797E−01 | 0.0000E+00 | 0.0000E+00 | 0.0000E+00 |
| S5 | −2.3617E−01 | 1.0129E+00 | −1.2038E+01 | 7.6160E+01 | −3.0433E+02 | 7.6252E+02 | −1.1644E+03 | 9.8780E+02 | −3.5304E+02 |
| S6 | −2.6056E−01 | 6.1633E−01 | −4.7615E+00 | 2.3008E+01 | −7.2748E+01 | 1.4473E+02 | −1.7470E+02 | 1.1699E+02 | 3.3006E+01 |
| S7 | −5.2089E−01 | 5.5827E−01 | 1.2818E−01 | −1.1446E+00 | 1.3188E+00 | 1.7735E−01 | −1.5687E+00 | 1.2200E+00 | −3.0951E−01 |
| S8 | −5.9498E−01 | 6.5253E−01 | −9.3070E−02 | −8.9718E−01 | 1.9217E+00 | −2.0362E+00 | 1.1896E+00 | −3.6535E−01 | 4.6133E−02 |
| S9 | 3.6364E−02 | −4.5318E−01 | 8.7534E−01 | −9.9320E−01 | 7.5409E−01 | −4.0347E−01 | 1.4130E−01 | −2.7840E−02 | 2.2900E−03 |
| S10 | 7.6390E−03 | −1.4665E−01 | 8.2822E−02 | 1.7081E−01 | −2.7106E−01 | 1.6236E−01 | −4.9420E−02 | 7.6340E−03 | −4.8000E−04 |
| S11 | −7.4839E−01 | 7.3110E−01 | −3.9817E−01 | 1.4151E−01 | −3.3710E−02 | 5.3230E−03 | −5.3000E−04 | 3.0600E−05 | −7.7000E−07 |
| S12 | −3.0222E−01 | 2.3655E−01 | −9.9330E−02 | 2.0289E−02 | −3.1000E−04 | −7.7000E−04 | 1.6300E−04 | −1.4000E−05 | 4.7000E−07 |

TABLE 3

| | |
|---|---|
| f1 (mm) | 3.15 |
| f2 (mm) | −9.21 |
| f3 (mm) | 20.61 |
| f4 (mm) | −9.81 |
| f5 (mm) | 3.28 |
| f6 (mm) | −2.35 |
| f (mm) | 3.35 |
| TTL (mm) | 4.00 |
| ImgH (mm) | 3.26 |

Table 3 shows effective focal lengths f1 to f6 of respective lens, a total effective focal length f of the optical imaging lens assembly, a distance TTL along the optical axis from the object-side surface S1 of the first lens E1 to the imaging plane S15, and half of a diagonal length ImgH of an effective pixel area on the imaging plane S15 in example 1.

Figure 2A:
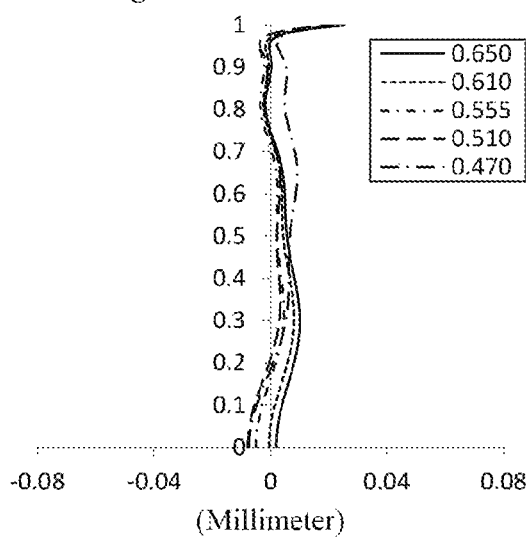
Figure 2B:
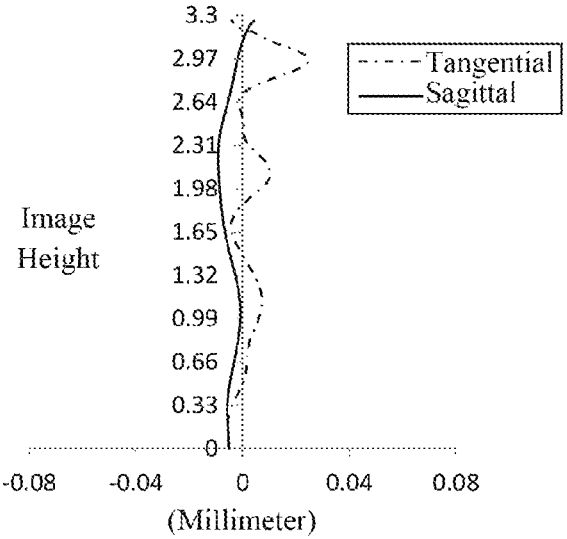

FIG. 2A illustrates a longitudinal aberration curve of the optical imaging lens assembly according to example 1, representing deviations of focal points converged by light of different wavelengths after passing through the lens assembly. FIG. 2B illustrates an astigmatic curve of the optical imaging lens assembly according to example 1, representing a curvature of a tangential plane and a curvature of a sagittal plane. FIG. 2C illustrates a distortion curve of the optical imaging lens assembly according to example 1, representing amounts of distortion corresponding to different image heights. FIG. 2D illustrates a lateral color curve of the optical imaging lens assembly according to example 1, representing deviations of different image heights on an imaging plane after light passes through the lens assembly. It can be seen from FIG. 2A to FIG. 2D that the optical imaging lens assembly provided in example 1 may achieve good image quality.

EXAMPLE 2

An optical imaging lens assembly according to example 2 of the present disclosure is described below with reference to FIG. 3 to FIG. 4D. In this example and the following examples, for the purpose of brevity, the description of parts similar to those in example 1 will be omitted. FIG. 3 shows a schematic structural view of the optical imaging lens assembly according to example 2 of the present disclosure.

As shown in FIG. 3, the optical imaging lens assembly according to an exemplary embodiment of the present disclosure includes a stop STO, a first lens E1, a second lens E2, a third lens E3, a fourth lens E4, a fifth lens E5, a sixth lens E6, an optical filter E7 and an imaging plane S15, which are sequentially arranged from an object side to an image side along an optical axis.

The first lens E1 has positive refractive power, an object-side surface S1 thereof is a convex surface, and an image-side surface S2 thereof is a concave surface. The second lens E2 has negative refractive power, an object-side surface S3 thereof is a concave surface, and an image-side surface S4 thereof is a concave surface. The third lens E3 has positive refractive power, an object-side surface S5 thereof is a convex surface, and an image-side surface S6 thereof is a concave surface. The fourth lens E4 has negative refractive power, an object-side surface S7 thereof is a concave surface, and an image-side surface S8 thereof is a concave surface. The fifth lens E5 has positive refractive power, an object-side surface S9 thereof is a convex surface, and an image-side surface S10 thereof is a convex surface. The sixth lens E6 has negative refractive power, an object-side surface S11 thereof is a convex surface, and an image-side surface S12 thereof is a concave surface. The optical filter E7 has an object-side surface S13 and an image-side surface S14. Light from an object sequentially passes through the respective surfaces S1 to S14 and is finally imaged on the imaging plane S15.

Table 4 shows surface type, radius of curvature, thickness, material and conic coefficient of each lens of the optical imaging lens assembly in example 2, wherein the units for the radius of curvature and the thickness are millimeter (mm).

TABLE 4

| Surface number | Surface type | Radius of curvature | Thickness | Material Refractive index | Abbe number | Conic coefficient |
|---|---|---|---|---|---|---|
| OBJ | Spherical | Infinite | Infinite | | | |
| STO | Spherical | Infinite | −0.3107 | | | |
| S1 | Aspheric | 1.2478 | 0.5397 | 1.55 | 56.1 | −0.2457 |
| S2 | Aspheric | 4.8138 | 0.0839 | | | 0.0000 |
| S3 | Aspheric | −27.3289 | 0.2000 | 1.68 | 19.2 | 0.0000 |
| S4 | Aspheric | 7.1900 | 0.2123 | | | 0.0000 |
| S5 | Aspheric | 13.4189 | 0.2403 | 1.55 | 56.1 | −46.0123 |
| S6 | Aspheric | 17.9056 | 0.1238 | | | −43.8578 |
| S7 | Aspheric | −158.9340 | 0.2103 | 1.67 | 20.4 | 30.0000 |
| S8 | Aspheric | 49.6229 | 0.4365 | | | −49.0000 |
| S9 | Aspheric | 3.8910 | 0.4373 | 1.55 | 56.1 | −20.2236 |
| S10 | Aspheric | −7.0990 | 0.5743 | | | −13.6022 |
| S11 | Aspheric | 35.4747 | 0.3080 | 1.55 | 56.1 | −24.6276 |
| S12 | Aspheric | 1.2312 | 0.3841 | | | −10.4556 |
| S13 | Spherical | Infinite | 0.1100 | 1.52 | 64.2 | |
| S14 | Spherical | Infinite | 0.1385 | | | |
| S15 | Spherical | Infinite | | | | |

As can be seen from Table 4, in example 2, the object-side surface and the image-side surface of any one of the first lens E1 to the sixth lens E6 are aspheric. Table 5 shows high-order coefficients applicable to each aspheric surface in example 2, wherein the surface shape of each aspheric surface may be defined by the formula (1) given in the above example 1.

TABLE 5

| Surface number | A4 | A6 | A8 | A10 | A12 |
|---|---|---|---|---|---|
| S1 | −9.6300E−03 | 3.4173E−01 | −2.2981E+00 | 9.2426E+00 | −2.2451E+01 |
| S2 | −1.3687E−01 | 1.3056E−01 | −9.8672E−01 | 5.7257E+00 | −1.7705E+01 |
| S3 | −1.5530E−01 | 4.0065E−01 | −3.1760E−02 | −3.3879E−01 | −5.4265E−01 |
| S4 | −5.6600E−02 | 3.8633E−01 | 1.5080E−01 | −7.7855E−01 | 1.2701E−01 |
| S5 | −3.1708E−01 | 2.1299E+00 | −2.2381E+01 | 1.4366E+02 | −5.9022E+02 |
| S6 | −4.0070E−01 | 2.1627E+00 | −1.4807E+01 | 6.8078E+01 | −2.0962E+02 |
| S7 | −6.0293E−01 | 1.4432E+00 | −4.3694E+00 | 1.1428E+01 | −2.3314E+01 |
| S8 | −4.9382E−01 | 6.6645E−01 | −7.4099E−01 | 5.5071E−01 | −1.0408E+00 |
| S9 | −7.9660E−02 | −6.6240E−02 | 9.3002E−02 | −1.8750E−02 | −1.8787E−01 |
| S10 | −3.2100E−03 | −1.3209E−01 | 3.0204E−01 | −3.4788E−01 | 1.9701E−01 |
| S11 | −7.6962E−01 | 8.8836E−01 | −5.8572E−01 | 2.4727E−01 | −6.8130E−02 |
| S12 | −3.3683E−01 | 3.1412E−01 | −1.8033E−01 | 6.6569E−02 | −1.5900E−02 |

TABLE 5-continued

| Surface number | A14 | A16 | A18 | A20 |
|---|---|---|---|---|
| S1 | 3.2070E+01 | −2.4916E+01 | 7.9892E+00 | 0.0000E+00 |
| S2 | 2.9571E+01 | −2.5867E+01 | 9.3523E+00 | 0.0000E+00 |
| S3 | 2.1380E+00 | −1.5664E+00 | 3.2836E−01 | 0.0000E+00 |
| S4 | 1.0346E+00 | 0.0000E+00 | 0.0000E+00 | 0.0000E+00 |
| S5 | 1.5304E+03 | −2.4199E+03 | 2.1207E+03 | −7.8577E+02 |
| S6 | 4.1511E+02 | −5.0711E+02 | 3.4711E+02 | −1.0099E+02 |
| S7 | 3.1939E+01 | −2.5898E+01 | 1.1310E+01 | −2.1352E+00 |
| S8 | 2.8933E+00 | −3.5058E+00 | 1.8716E+00 | −3.7316E−01 |
| S9 | 2.2159E−01 | −1.0182E−01 | 2.1294E−02 | −1.6900E−03 |
| S10 | −5.3270E−02 | 4.6040E−03 | 6.4500E−04 | −1.1000E−04 |
| S11 | 1.2183E−02 | −1.3600E−03 | 8.7000E−05 | −2.4000E−06 |
| S12 | 2.3810E−03 | −2.1000E−04 | 9.6100E−06 | −1.6000E−07 |

Table 6 shows effective focal lengths f1 to f6 of respective lens, a total effective focal length f of the optical imaging lens assembly, a distance TTL along the optical axis from the object-side surface S1 of the first lens E1 to the imaging plane S15, and half of a diagonal length ImgH of an effective pixel area on the imaging plane S15 in example 2.

TABLE 6

| f1 (mm) | 2.93 |
|---|---|
| f2 (mm) | −8.38 |
| f3 (mm) | 96.27 |
| f4 (mm) | −56.72 |
| f5 (mm) | 4.67 |
| f6 (mm) | −2.34 |
| f (mm) | 3.50 |
| TTL (mm) | 4.00 |
| ImgH (mm) | 3.26 |

Figure 4A:
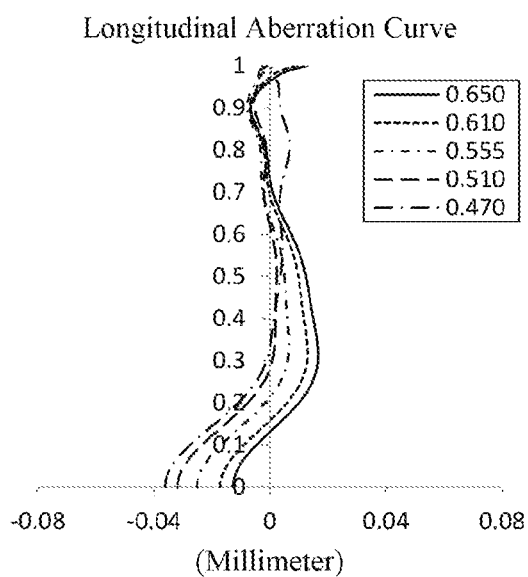
FIGS. 4A to 4D illustrate a longitudinal aberration curve, an astigmatic curve, a distortion curve, and a lateral color curve of the optical imaging lens assembly of the example 2, respectively.
Figure 4B:
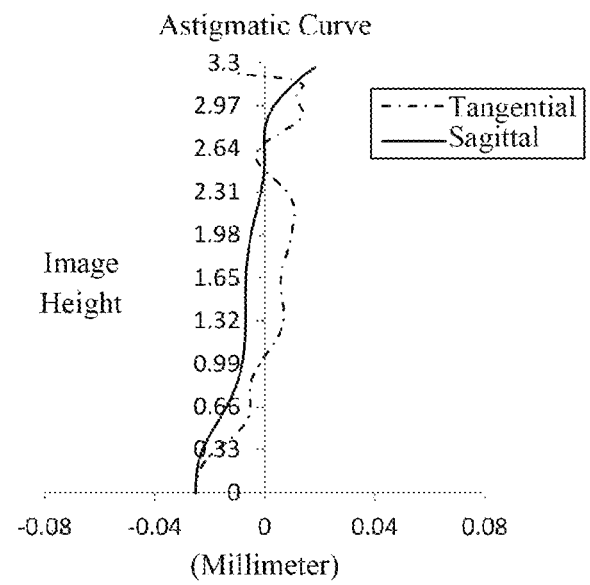
Figure 4C:
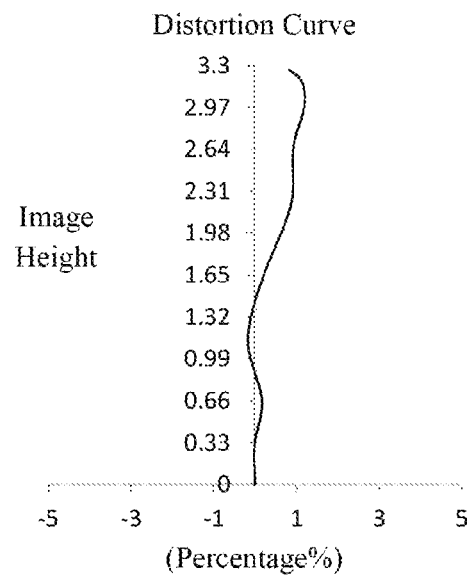
Figure 4D:
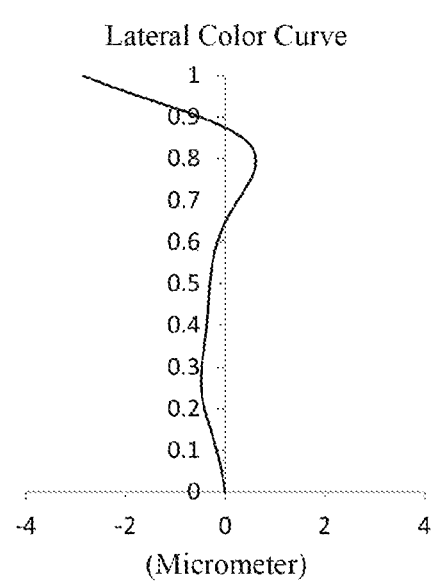

FIG. 4A illustrates a longitudinal aberration curve of the optical imaging lens assembly according to example 2, representing deviations of focal points converged by light of different wavelengths after passing through the lens assembly. FIG. 4B illustrates an astigmatic curve of the optical imaging lens assembly according to example 2, representing a curvature of a tangential plane and a curvature of a sagittal plane. FIG. 4C illustrates a distortion curve of the optical imaging lens assembly according to example 2, representing amounts of distortion corresponding to different image heights. FIG. 4D illustrates a lateral color curve of the optical imaging lens assembly according to example 2, representing deviations of different image heights on an imaging plane after light passes through the lens assembly. It can be seen from FIG. 4A to FIG. 4D that the optical imaging lens assembly provided in example 2 may achieve good image quality.

EXAMPLE 3

Figure 5:
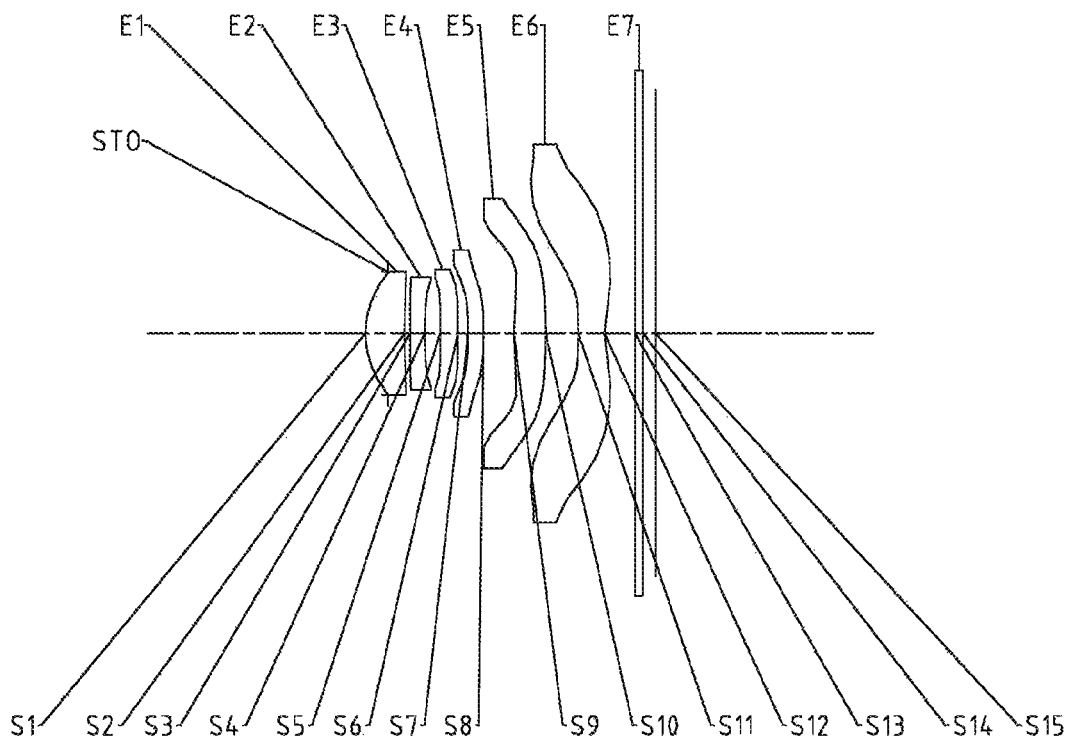
FIG. 5 illustrates a schematic structural view of an optical imaging lens assembly according to example 3 of the present disclosure.

An optical imaging lens assembly according to example 3 of the present disclosure is described below with reference to FIG. 5 to FIG. 6D. FIG. 5 shows a schematic structural view of the optical imaging lens assembly according to example 3 of the present disclosure.

As shown in FIG. 5, the optical imaging lens assembly according to an exemplary embodiment of the present disclosure includes a stop STO, a first lens E1, a second lens E2, a third lens E3, a fourth lens E4, a fifth lens E5, a sixth lens E6, an optical filter E7 and an imaging plane S15, which are sequentially arranged from an object side to an image side along an optical axis.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a concave surface. The fourth lens E4 has negative refractive power, an object-side surface S7 thereof is a concave surface, and an image-side surface S8 thereof is a convex surface. The fifth lens E5 has positive refractive power, an object-side surface S9 thereof is a convex surface, and an image-side surface S10 thereof is a convex surface. The sixth lens E6 has negative refractive power, an object-side surface S11 thereof is a convex surface, and an image-side surface S12 thereof is a concave surface. The optical filter E7 has an object-side surface S13 and an image-side surface S14. Light from an object sequentially passes through the respective surfaces S1 to S14 and is finally imaged on the imaging plane S15.

Table 7 shows surface type, radius of curvature, thickness, material and conic coefficient of each lens of the optical imaging lens assembly in example 3, wherein the units for the radius of curvature and the thickness are millimeter (mm).

TABLE 7

| Surface number | Surface type | Radius of curvature | Thickness | Material | | Conic coefficient |
|---|---|---|---|---|---|---|
| | | | | Refractive index | Abbe number | |
| OBJ | Spherical | Infinite | Infinite | | | |
| STO | Spherical | Infinite | −0.3107 | | | |
| S1 | Aspheric | 1.2431 | 0.5376 | 1.55 | 56.1 | −0.2547 |
| S2 | Aspheric | 4.6899 | 0.0791 | | | 0.0000 |
| S3 | Aspheric | 768.4471 | 0.2000 | 1.68 | 19.2 | 0.0000 |
| S4 | Aspheric | 5.8854 | 0.2144 | | | 0.0000 |
| S5 | Aspheric | 13.4189 | 0.2427 | 1.55 | 56.1 | 9.0661 |

TABLE 7-continued

| Surface number | Surface type | Radius of curvature | Thickness | Material Refractive index | Abbe number | Conic coefficient |
|---|---|---|---|---|---|---|
| S6 | Aspheric | 17.2926 | 0.1417 | | | −49.0000 |
| S7 | Aspheric | −26.8682 | 0.2100 | 1.67 | 20.4 | 9.3014 |
| S8 | Aspheric | −50.9689 | 0.4186 | | | −49.0000 |
| S9 | Aspheric | 3.6776 | 0.4392 | 1.55 | 56.1 | −18.3407 |
| S10 | Aspheric | −8.7626 | 0.4488 | | | −11.8211 |
| S11 | Aspheric | 21.8423 | 0.3616 | 1.55 | 56.1 | 30.0000 |
| S12 | Aspheric | 1.2846 | 0.4204 | | | −10.6324 |
| S13 | Spherical | Infinite | 0.1100 | 1.52 | 64.2 | |
| S14 | Spherical | Infinite | 0.1748 | | | |
| S15 | Spherical | Infinite | | | | |

As can be seen from Table 7, in example 3, the object-side surface and the image-side surface of any one of the first lens E1 to the sixth lens E6 are aspheric. Table 8 shows high-order coefficients applicable to each aspheric surface in example 3, wherein the surface shape of each aspheric surface may be defined by the formula (1) given in the above example 1.

TABLE 8

| Surface number | A4 | A6 | A8 | A10 | A12 |
|---|---|---|---|---|---|
| S1 | −1.4720E−02 | 4.1578E−01 | −2.9613E+00 | 1.2627E+01 | −3.2428E+01 |
| S2 | −1.5021E−01 | 3.1875E−01 | −2.7401E+00 | 1.5321E+01 | −4.8111E+01 |
| S3 | −1.6504E−01 | 4.8467E−01 | −8.9601E−01 | 4.5870E+00 | −1.7087E+01 |
| S4 | −5.6960E−02 | 4.1155E−01 | −2.8990E−02 | −3.3020E−01 | −3.6352E−01 |
| S5 | −3.0863E−01 | 1.9690E+00 | −2.0946E+01 | 1.3763E+02 | −5.7725E+02 |
| S6 | −3.7269E−01 | 2.0100E+00 | −1.5133E+01 | 7.4385E+01 | −2.3885E+02 |
| S7 | −4.9795E−01 | 3.2654E−01 | 2.0697E+00 | −1.2990E+01 | 3.5613E+01 |
| S8 | −4.2464E−01 | 4.1251E−02 | 2.0319E+00 | −7.2390E+00 | 1.2829E+01 |
| S9 | −6.4740E−02 | −8.1210E−02 | 5.4324E−02 | 1.2836E−01 | −4.1655E−01 |
| S10 | −6.7400E−03 | −1.2471E−01 | 3.2017E−01 | −3.9907E−01 | 2.4831E−01 |
| S11 | −7.4152E−01 | 8.3698E−01 | −5.5404E−01 | 2.4134E−01 | −6.9740E−02 |
| S12 | −3.2952E−01 | 3.2574E−01 | −2.0704E−01 | 8.4928E−02 | −2.2440E−02 |

| Surface number | A14 | A16 | A18 | A20 |
|---|---|---|---|---|
| S1 | 4.8774E+01 | −3.9636E+01 | 1.3288E+01 | 0.0000E+00 |
| S2 | 8.4802E+01 | −7.9243E+01 | 3.0603E+01 | 0.0000E+00 |
| S3 | 3.4430E+01 | −3.5291E+01 | 1.4844E+01 | 0.0000E+00 |
| S4 | 1.2049E+00 | 0.0000E+00 | 0.0000E+00 | 0.0000E+00 |
| S5 | 1.5226E+03 | −2.4421E+03 | 2.1664E+03 | −8.1135E+02 |
| S6 | 4.8747E+02 | −6.0957E+02 | 4.2447E+02 | −1.2499E+02 |
| S7 | −5.5429E+01 | 5.0194E+01 | −2.3903E+01 | 4.4003E+00 |
| S8 | −1.2414E+01 | 6.6705E+00 | −1.8774E+00 | 2.1612E−01 |
| S9 | 4.1000E−01 | −1.8642E−01 | 4.0831E−02 | −3.5100E−03 |
| S10 | −8.0680E−02 | 1.2946E−02 | −7.3000E−04 | −1.8000E−05 |
| S11 | 1.3180E−02 | −1.5600E−03 | 1.0600E−04 | −3.1000E−06 |
| S12 | 3.7260E−03 | −3.7000E−04 | 1.9600E−05 | −4.2000E−07 |

Table 9 shows effective focal lengths f1 to f6 of respective lens, a total effective focal length f of the optical imaging lens assembly, a distance TTL along the optical axis from the object-side surface S1 of the first lens E1 to the imaging plane S15, and half of a diagonal length ImgH of an effective pixel area on the imaging plane S15 in example 3.

TABLE 9

| | |
|---|---|
| f1 (mm) | 2.94 |
| f2 (mm) | −8.75 |
| f3 (mm) | 107.35 |
| f4 (mm) | −85.56 |
| f5 (mm) | 4.80 |
| f6 (mm) | −2.52 |
| f (mm) | 3.50 |
| TTL (mm) | 4.00 |
| ImgH (mm) | 3.32 |

Figures 6A, 6B:
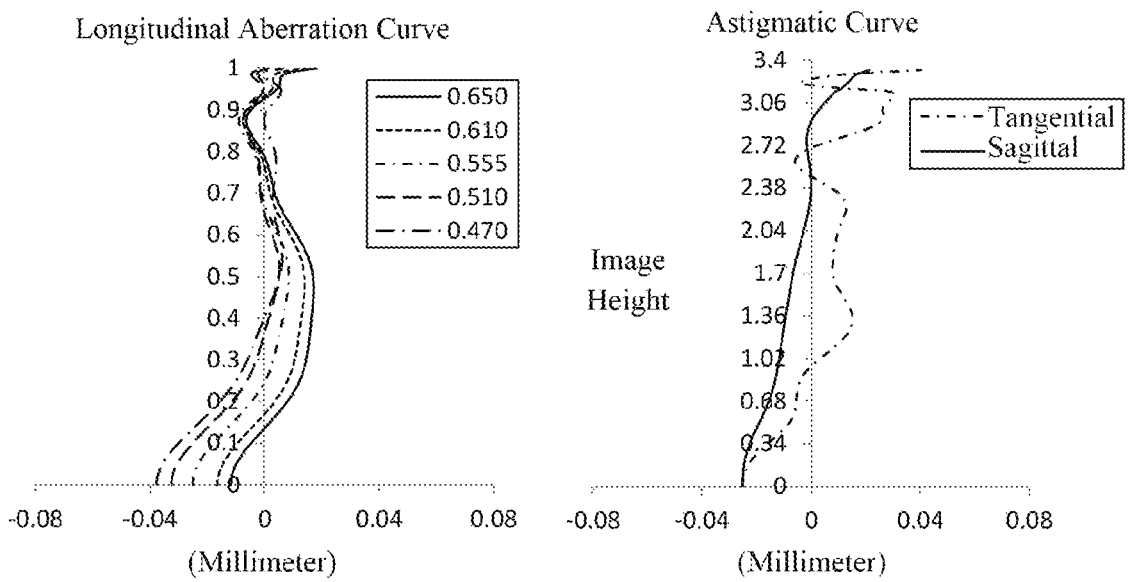
FIGS. 6A to 6D illustrate a longitudinal aberration curve, an astigmatic curve, a distortion curve, and a lateral color curve of the optical imaging lens assembly of the example 3, respectively.
Figure 6C:
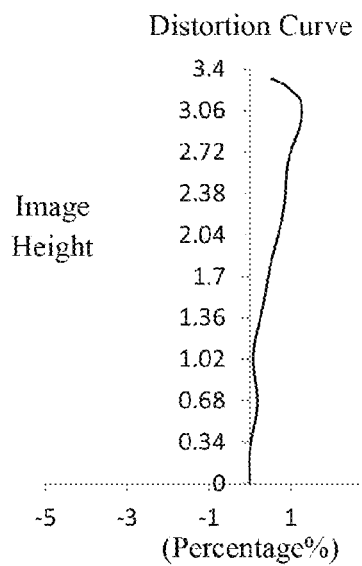
Figure 6D:
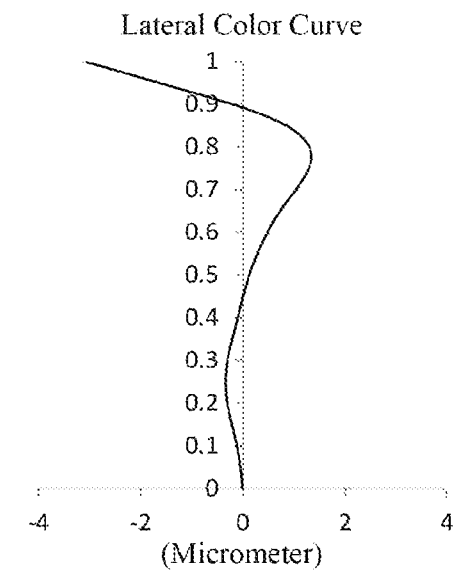

FIG. 6A illustrates a longitudinal aberration curve of the optical imaging lens assembly according to example 3, representing deviations of focal points converged by light of different wavelengths after passing through the lens assembly. FIG. 6B illustrates an astigmatic curve of the optical imaging lens assembly according to example 3, representing a curvature of a tangential plane and a curvature of a sagittal plane. FIG. 6C illustrates a distortion curve of the optical imaging lens assembly according to example 3, representing amounts of distortion corresponding to different image heights. FIG. 6D illustrates a lateral color curve of the optical imaging lens assembly according to example 3, representing deviations of different image heights on an imaging plane after light passes through the lens assembly.

It can be seen from FIG. 6A to FIG. 6D that the optical imaging lens assembly provided in example 3 may achieve good image quality.

EXAMPLE 4

Figure 7:
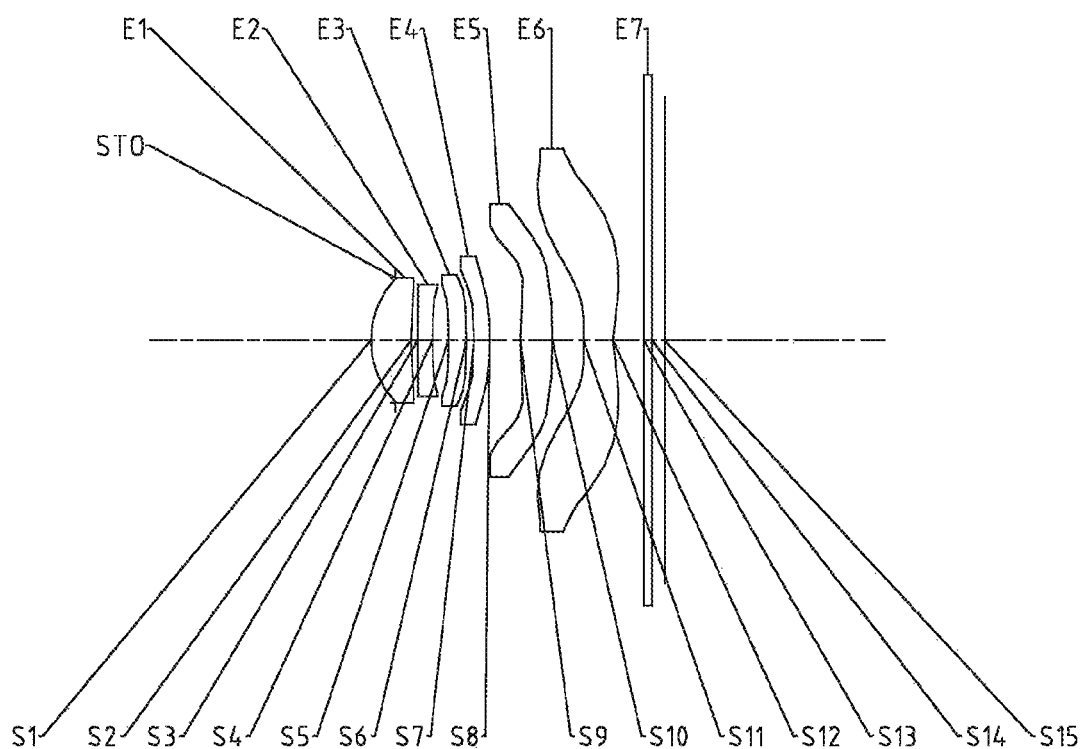
FIG. 7 illustrates a schematic structural view of an optical imaging lens assembly according to example 4 of the present disclosure.

An optical imaging lens assembly according to example 4 of the present disclosure is described below with reference to FIG. 7 to FIG. 8D. FIG. 7 shows a schematic structural view of the optical imaging lens assembly according to example 4 of the present disclosure.

As shown in FIG. 7, the optical imaging lens assembly according to an exemplary embodiment of the present disclosure includes a stop STO, a first lens E1, a second lens E2, a third lens E3, a fourth lens E4, a fifth lens E5, a sixth lens E6, an optical filter E7 and an imaging plane S15, which are sequentially arranged from an object side to an image side along an optical axis.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has negative refractive power, an object-side surface S5 thereof is a concave surface, and an image-side surface S6 thereof is a convex surface. The fourth lens E4 has negative refractive power, an object-side surface S7 thereof is a concave surface, and an image-side surface S8 thereof is a convex surface. The fifth lens E5 has positive refractive power, an object-side surface S9 thereof is a convex surface, and an image-side surface S10 thereof is a convex surface. The sixth lens E6 has negative refractive power, an object-side surface S11 thereof is a convex surface, and an image-side surface S12 thereof is a concave surface. The optical filter E7 has an object-side surface S13 and an image-side surface S14. Light from an object sequentially passes through the respective surfaces S1 to S14 and is finally imaged on the imaging plane S15.

Table 10 shows surface type, radius of curvature, thickness, material and conic coefficient of each lens of the optical imaging lens assembly in example 4, wherein the units for the radius of curvature and the thickness are millimeter (mm).

TABLE 10

| Surface number | Surface type | Radius of curvature | Thickness | Material Refractive index | Abbe number | Conic coefficient |
|---|---|---|---|---|---|---|
| OBJ | Spherical | Infinite | Infinite | | | |
| STO | Spherical | Infinite | −0.3327 | | | |
| S1 | Aspheric | 1.2236 | 0.5450 | 1.55 | 56.1 | −0.1580 |
| S2 | Aspheric | 3.8942 | 0.0944 | | | 0.0000 |
| S3 | Aspheric | 887.0068 | 0.2000 | 1.68 | 19.2 | 0.0000 |
| S4 | Aspheric | 8.0208 | 0.2157 | | | 0.0000 |
| S5 | Aspheric | −37.1366 | 0.2452 | 1.55 | 56.1 | −47.0689 |
| S6 | Aspheric | −45.0950 | 0.1037 | | | −40.7685 |
| S7 | Aspheric | −28.2880 | 0.2100 | 1.67 | 20.4 | 30.0000 |
| S8 | Aspheric | −74.5405 | 0.4182 | | | 30.0000 |
| S9 | Aspheric | 3.5387 | 0.4355 | 1.55 | 56.1 | −20.0998 |
| S10 | Aspheric | −15.2138 | 0.4253 | | | −26.6631 |
| S11 | Aspheric | 12.2009 | 0.3991 | 1.55 | 56.1 | 10.0238 |
| S12 | Aspheric | 1.3452 | 0.4218 | | | −9.3246 |
| S13 | Spherical | Infinite | 0.1100 | 1.52 | 64.2 | |
| S14 | Spherical | Infinite | 0.1751 | | | |
| S15 | Spherical | Infinite | | | | |

As can be seen from Table 10, in example 4, the object-side surface and the image-side surface of any one of the first lens E1 to the sixth lens E6 are aspheric. Table 11 shows high-order coefficients applicable to each aspheric surface in example 4, wherein the surface shape of each aspheric surface may be defined by the formula (1) given in the above example 1.

TABLE 11

| Surface number | A4 | A6 | A8 | A10 | A12 |
|---|---|---|---|---|---|
| S1 | 8.2790E−03 | 9.8111E−02 | −5.8828E−01 | 2.5025E+00 | −6.5079E+00 |
| S2 | −9.8060E−02 | 5.8062E−02 | −9.5132E−01 | 6.1245E+00 | −2.0627E+01 |
| S3 | −1.2813E−01 | 1.3946E−01 | 8.4784E−01 | −3.2650E+00 | 6.7333E+00 |
| S4 | −4.7580E−02 | 2.8026E−01 | 1.7227E−01 | −1.5320E−02 | −1.3219E+00 |
| S5 | −1.6310E−01 | −1.2730E−02 | −1.9829E+00 | 2.1720E+01 | −1.2739E+02 |
| S6 | −2.9245E−01 | 1.1367E+00 | −8.1061E+00 | 3.9244E+01 | −1.2607E+02 |
| S7 | −4.8411E−01 | 5.0802E−01 | 1.0769E+00 | −9.3145E+00 | 2.8166E+01 |
| S8 | −4.3727E−01 | 4.4067E−01 | 8.1918E−02 | −1.8286E+00 | 4.0670E+00 |
| S9 | −1.0743E−01 | 1.0222E−01 | −3.4327E−01 | 6.6433E−01 | −8.8311E−01 |
| S10 | −8.5170E−02 | 3.7416E−02 | 1.1559E−01 | −2.3017E−01 | 1.6021E−01 |
| S11 | −7.4400E−01 | 8.1349E−01 | −5.1765E−01 | 2.1705E−01 | −6.0840E−02 |
| S12 | −3.3483E−01 | 3.2885E−01 | −2.0643E−01 | 8.3298E−02 | −2.1700E−02 |

TABLE 11-continued

| Surface number | A14 | A16 | A18 | A20 |
|---|---|---|---|---|
| S1 | 9.8598E+00 | −7.9623E+00 | 2.5293E+00 | 0.0000E+00 |
| S2 | 3.8001E+01 | −3.6565E+01 | 1.4301E+01 | 0.0000E+00 |
| S3 | −8.1312E+00 | 5.4588E+00 | −1.4663E+00 | 0.0000E+00 |
| S4 | 2.0883E+00 | 0.0000E+00 | 0.0000E+00 | 0.0000E+00 |
| S5 | 4.2201E+02 | −8.0317E+02 | 8.1430E+02 | −3.3863E+02 |
| S6 | 2.5767E+02 | −3.2250E+02 | 2.2467E+02 | −6.6042E+01 |
| S7 | −4.6813E+01 | 4.4809E+01 | −2.2922E+01 | 4.7732E+00 |
| S8 | −3.9504E+00 | 1.7840E+00 | −3.0075E−01 | −4.1000E−03 |
| S9 | 6.6979E−01 | −2.7522E−01 | 5.7735E−02 | −4.8800E−03 |
| S10 | −5.2820E−02 | 7.8630E−03 | −2.4000E−04 | −3.6000E−05 |
| S11 | 1.1248E−02 | −1.3200E−03 | 8.8100E−05 | −2.6000E−06 |
| S12 | 3.5700E−03 | −3.5000E−04 | 1.8900E−05 | −4.1000E−07 |

Table 12 shows effective focal lengths f1 to f6 of respective lens, a total effective focal length f of the optical imaging lens assembly, a distance TTL along the optical axis from the object-side surface S1 of the first lens E1 to the imaging plane S15, and half of a diagonal length ImgH of an effective pixel area on the imaging plane S15 in example 4.

TABLE 12

| f1 (mm) | 3.05 |
|---|---|
| f2 (mm) | −11.95 |
| f3 (mm) | −389.68 |
| f4 (mm) | −68.53 |
| f5 (mm) | 5.30 |
| f6 (mm) | −2.81 |
| f (mm) | 3.52 |
| TTL (mm) | 4.00 |
| ImgH (mm) | 3.30 |

Figure 8A:
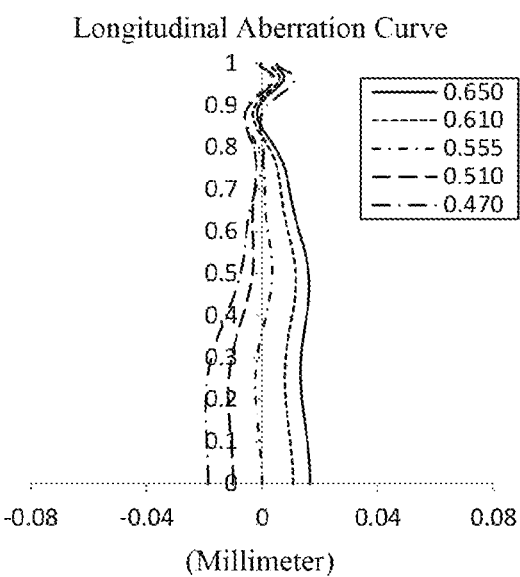
FIGS. 8A to 8D illustrate a longitudinal aberration curve, an astigmatic curve, a distortion curve, and a lateral color curve of the optical imaging lens assembly of the example 4, respectively.
Figure 8B:
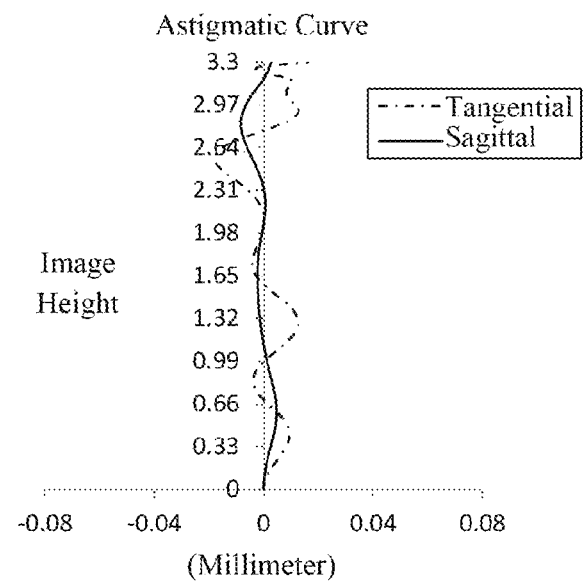
Figure 8C:
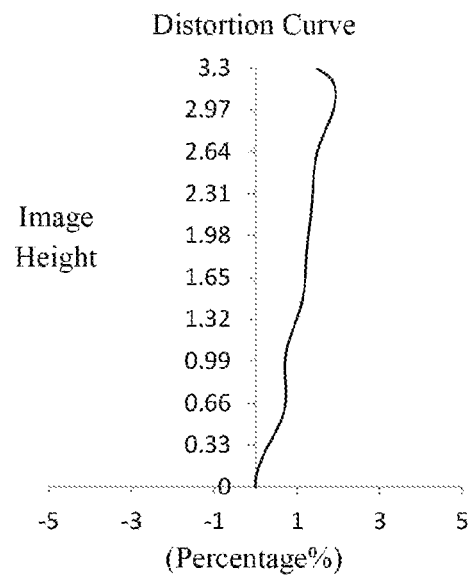
Figure 8D:
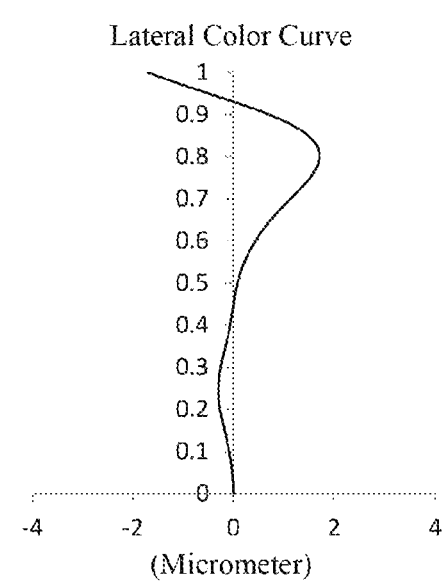

FIG. 8A illustrates a longitudinal aberration curve of the optical imaging lens assembly according to example 4, representing deviations of focal points converged by light of different wavelengths after passing through the lens assembly. FIG. 8B illustrates an astigmatic curve of the optical imaging lens assembly according to example 4, representing a curvature of a tangential plane and a curvature of a sagittal plane. FIG. 8C illustrates a distortion curve of the optical imaging lens assembly according to example 4, representing amounts of distortion corresponding to different image heights. FIG. 8D illustrates a lateral color curve of the optical imaging lens assembly according to example 4, representing deviations of different image heights on an imaging plane after light passes through the lens assembly. It can be seen from FIG. 8A to FIG. 8D that the optical imaging lens assembly provided in example 4 may achieve good image quality.

EXAMPLE 5

Figure 9:
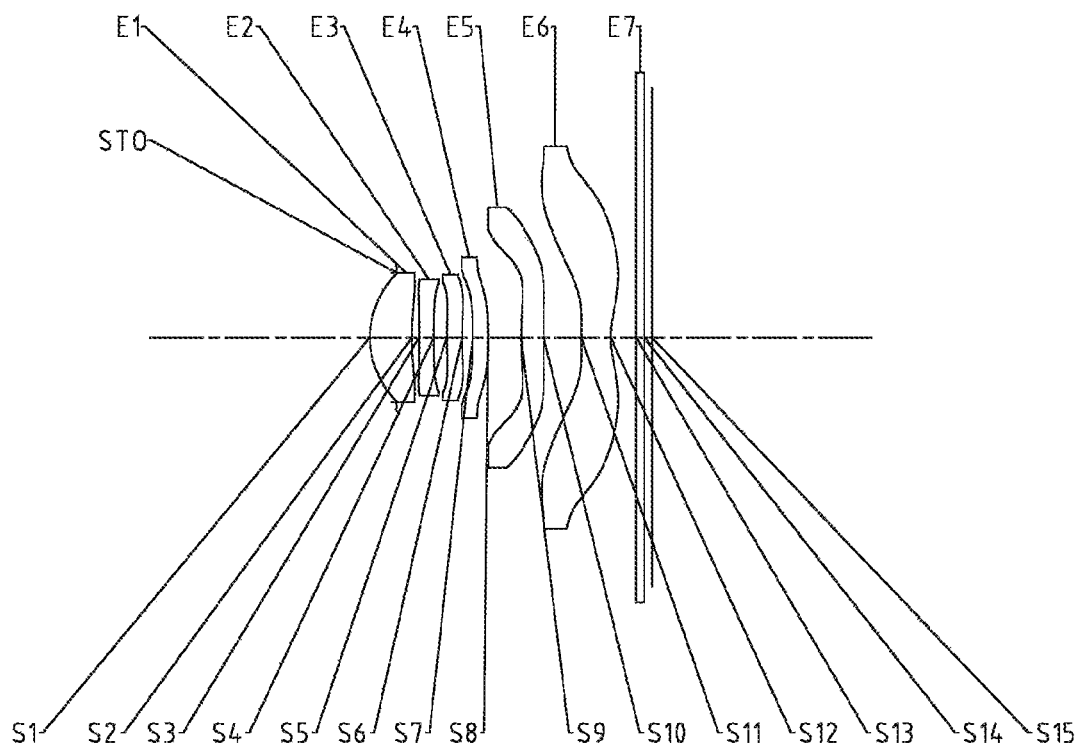
FIG. 9 illustrates a schematic structural view of an optical imaging lens assembly according to example 5 of the present disclosure.

An optical imaging lens assembly according to example 5 of the present disclosure is described below with reference to FIG. 9 to FIG. 10D. FIG. 9 shows a schematic structural view of the optical imaging lens assembly according to example 5 of the present disclosure.

As shown in FIG. 9, the optical imaging lens assembly according to an exemplary embodiment of the present disclosure includes a stop STO, a first lens E1, a second lens E2, a third lens E3, a fourth lens E4, a fifth lens E5, a sixth lens E6, an optical filter E7 and an imaging plane S15, which are sequentially arranged from an object side to an image side along an optical axis.

The first lens E1 has positive refractive power, an object-side surface S1 thereof is a convex surface, and an image-side surface S2 thereof is a concave surface. The second lens E2 has negative refractive power, an object-side surface S3 thereof is a concave surface, and an image-side surface S4 thereof is a concave surface. The third lens E3 has negative refractive power, an object-side surface S5 thereof is a convex surface, and an image-side surface S6 thereof is a concave surface. The fourth lens E4 has positive refractive power, an object-side surface S7 thereof is a concave surface, and an image-side surface S8 thereof is a convex surface. The fifth lens E5 has positive refractive power, an object-side surface S9 thereof is a convex surface, and an image-side surface S10 thereof is a concave surface. The sixth lens E6 has negative refractive power, an object-side surface S11 thereof is a convex surface, and an image-side surface S12 thereof is a concave surface. The optical filter E7 has an object-side surface S13 and an image-side surface S14. Light from an object sequentially passes through the respective surfaces S1 to S14 and is finally imaged on the imaging plane S15.

Table 13 shows surface type, radius of curvature, thickness, material and conic coefficient of each lens of the optical imaging lens assembly in example 5, wherein the units for the radius of curvature and the thickness are millimeter (mm).

TABLE 13

| Surface number | Surface type | Radius of curvature | Thickness | Material | | Conic coefficient |
|---|---|---|---|---|---|---|
| | | | | Refractive index | Abbe number | |
| OBJ | Spherical | Infinite | Infinite | | | |
| STO | Spherical | Infinite | −0.3630 | | | |
| S1 | Aspheric | 1.1975 | 0.5747 | 1.55 | 56.1 | −0.2045 |
| S2 | Aspheric | 3.7733 | 0.0976 | | | 0.0000 |
| S3 | Aspheric | −56.7779 | 0.2000 | 1.68 | 19.2 | 0.0000 |
| S4 | Aspheric | 9.2440 | 0.1785 | | | 0.0000 |
| S5 | Aspheric | 6.4326 | 0.2080 | 1.55 | 56.1 | −41.8502 |

TABLE 13-continued

| Surface number | Surface type | Radius of curvature | Thickness | Material Refractive index | Abbe number | Conic coefficient |
|---|---|---|---|---|---|---|
| S6 | Aspheric | 4.8402 | 0.1437 | | | −39.0239 |
| S7 | Aspheric | −93.9750 | 0.2100 | 1.67 | 20.4 | −49.0000 |
| S8 | Aspheric | −10.6610 | 0.4527 | | | 30.0000 |
| S9 | Aspheric | 4.8974 | 0.3072 | 1.55 | 56.1 | −42.3521 |
| S10 | Aspheric | 34.3261 | 0.5133 | | | 30.0000 |
| S11 | Aspheric | 8.5540 | 0.3982 | 1.55 | 56.1 | 2.9477 |
| S12 | Aspheric | 1.0244 | 0.3514 | | | −12.3776 |
| S13 | Spherical | Infinite | 0.1100 | 1.52 | 64.2 | |
| S14 | Spherical | Infinite | 0.1047 | | | |
| S15 | Spherical | Infinite | | | | |

As can be seen from Table 13, in example 5, the object-side surface and the image-side surface of any one of the first lens E1 to the sixth lens E6 are aspheric. Table 14 shows high-order coefficients applicable to each aspheric surface in example 5, wherein the surface shape of each aspheric surface may be defined by the formula (1) given in the above example 1.

TABLE 14

| Surface number | A4 | A6 | A8 | A10 | A12 |
|---|---|---|---|---|---|
| S1 | −5.7900E−03 | 2.5061E−01 | −1.6906E+00 | 6.9724E+00 | −1.7239E+01 |
| S2 | −1.0999E−01 | 1.4615E−01 | −1.4646E+00 | 7.3184E+00 | −2.0634E+01 |
| S3 | −1.4016E−01 | 2.7191E−01 | 4.4301E−01 | −2.6654E+00 | 7.0510E+00 |
| S4 | −8.4990E−02 | 4.7676E−01 | −3.8141E−01 | 1.3194E+00 | −3.6573E+00 |
| S5 | −3.0934E−01 | 9.2348E−01 | −7.6414E+00 | 5.1123E+01 | −2.3541E+02 |
| S6 | −3.9398E−01 | 2.6081E+00 | −2.1357E+01 | 1.1164E+02 | −3.7266E+02 |
| S7 | −3.2766E−01 | −2.6477E−01 | 4.4233E+00 | −2.5158E+01 | 7.8701E+01 |
| S8 | −2.8314E−01 | 1.0356E−01 | −1.6352E−01 | 1.4030E+00 | −5.5947E+00 |
| S9 | −5.3450E−02 | −4.0550E−02 | −3.2377E−01 | 7.4359E−01 | −1.1613E+00 |
| S10 | −1.3140E−02 | −2.5200E−02 | 2.6960E−03 | −1.2275E−01 | 1.8829E−01 |
| S11 | −7.0429E−01 | 7.8496E−01 | −4.9537E−01 | 2.0026E−01 | −5.3330E−02 |
| S12 | −2.0012E−01 | 1.1192E−01 | −3.9980E−02 | 9.5690E−03 | −1.3100E−03 |

| Surface number | A14 | A16 | A18 | A20 |
|---|---|---|---|---|
| S1 | 2.4845E+01 | −1.9207E+01 | 6.0407E+00 | 0.0000E+00 |
| S2 | 3.2600E+01 | −2.7271E+01 | 9.5049E+00 | 0.0000E+00 |
| S3 | −1.1487E+01 | 1.0690E+01 | −3.8612E+00 | 0.0000E+00 |
| S4 | 3.5565E+00 | 0.0000E+00 | 0.0000E+00 | 0.0000E+00 |
| S5 | 6.8346E+02 | −1.1998E+03 | 1.1522E+03 | −4.6156E+02 |
| S6 | 7.8576E+02 | −1.0150E+03 | 7.3059E+02 | −2.2258E+02 |
| S7 | −1.4199E+02 | 1.4612E+02 | −7.8154E+01 | 1.6384E+01 |
| S8 | 1.2245E+01 | −1.3503E+01 | 7.1728E+00 | −1.4756E+00 |
| S9 | 1.1079E+00 | −5.7514E−01 | 1.5100E−01 | −1.5820E−02 |
| S10 | −1.1929E−01 | 3.9115E−02 | −6.6100E−03 | 4.5900E−04 |
| S11 | 9.3210E−03 | −1.0300E−03 | 6.5600E−05 | −1.8000E−06 |
| S12 | −2.0000E−05 | 3.8000E−05 | −5.1000E−06 | 2.1600E−07 |

Table 15 shows effective focal lengths f1 to f6 of respective lens, a total effective focal length f of the optical imaging lens assembly, a distance TTL along the optical axis from the object-side surface S1 of the first lens E1 to the imaging plane S15, and half of a diagonal length ImgH of an effective pixel area on the imaging plane S15 in example 5.

TABLE 15

| | |
|---|---|
| f1 (mm) | 2.98 |
| f2 (mm) | −11.72 |
| f3 (mm) | −37.55 |
| f4 (mm) | 18.03 |
| f5 (mm) | 10.42 |

TABLE 15-continued

| | |
|---|---|
| f6 (mm) | −2.17 |
| f (mm) | 3.63 |
| TTL (mm) | 3.85 |
| ImgH (mm) | 3.36 |

Figure 10A:
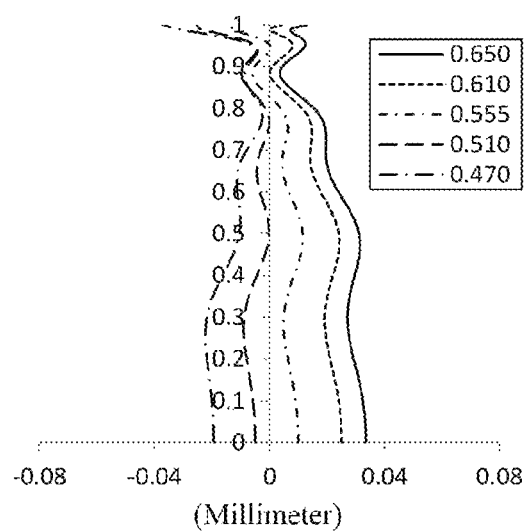
Figure 10B:
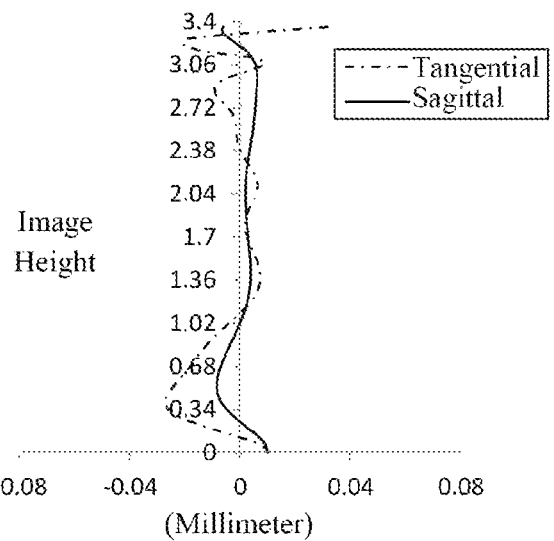

FIG. 10A illustrates a longitudinal aberration curve of the optical imaging lens assembly according to example 5, representing deviations of focal points converged by light of different wavelengths after passing through the lens assembly. FIG. 10B illustrates an astigmatic curve of the optical imaging lens assembly according to example 5, representing a curvature of a tangential plane and a curvature of a sagittal plane. FIG. 10C illustrates a distortion curve of the optical imaging lens assembly according to example 5, representing amounts of distortion corresponding to different field-of-views. FIG. 10D illustrates a lateral color curve of the optical imaging lens assembly according to example 5, representing deviations of different image heights on an imaging plane after light passes through the lens assembly.

It can be seen from FIG. 10A to FIG. 10D that the optical imaging lens assembly provided in example 5 may achieve good image quality.

EXAMPLE 6

An optical imaging lens assembly according to example 6 of the present disclosure is described below with reference to FIG. 11 to FIG. 12D. FIG. 11 shows a schematic structural view of the optical imaging lens assembly according to example 6 of the present disclosure.

As shown in FIG. 11, the optical imaging lens assembly according to an exemplary embodiment of the present disclosure includes a stop STO, a first lens E1, a second lens E2, a third lens E3, a fourth lens E4, a fifth lens E5, a sixth lens E6, an optical filter E7 and an imaging plane S15, which are sequentially arranged from an object side to an image side along an optical axis.

The first lens E1 has positive refractive power, an object-side surface S1 thereof is a convex surface, and an image-side surface S2 thereof is a concave surface. The second lens E2 has negative refractive power, an object-side surface S3 thereof is a concave surface, and an image-side surface S4 thereof is a concave surface. The third lens E3 has negative refractive power, an object-side surface S5 thereof is a convex surface, and an image-side surface S6 thereof is a concave surface. The fourth lens E4 has positive refractive power, an object-side surface S7 thereof is a concave surface, and an image-side surface S8 thereof is a convex surface. The fifth lens E5 has positive refractive power, an object-side surface S9 thereof is a convex surface, and an image-side surface S10 thereof is a concave surface. The sixth lens E6 has negative refractive power, an object-side surface S11 thereof is a convex surface, and an image-side surface S12 thereof is a concave surface. The optical filter E7 has an object-side surface S13 and an image-side surface S14. Light from an object sequentially passes through the respective surfaces S1 to S14 and is finally imaged on the imaging plane S15.

Table 16 shows surface type, radius of curvature, thickness, material and conic coefficient of each lens of the optical imaging lens assembly in example 6, wherein the units for the radius of curvature and the thickness are millimeter (mm).

TABLE 16

| Surface number | Surface type | Radius of curvature | Thickness | Material Refractive index | Abbe number | Conic coefficient |
|---|---|---|---|---|---|---|
| OBJ | Spherical | Infinite | Infinite | | | |
| STO | Spherical | Infinite | −0.3746 | | | |
| S1 | Aspheric | 1.2346 | 0.5901 | 1.55 | 56.1 | −0.1965 |
| S2 | Aspheric | 4.2453 | 0.0999 | | | 0.0000 |
| S3 | Aspheric | −18.1234 | 0.2000 | 1.68 | 19.2 | 0.0000 |
| S4 | Aspheric | 9.0184 | 0.1786 | | | 0.0000 |
| S5 | Aspheric | 5.2018 | 0.2189 | 1.55 | 56.1 | −34.0584 |
| S6 | Aspheric | 4.8268 | 0.1588 | | | −39.8803 |
| S7 | Aspheric | −40.4003 | 0.2100 | 1.67 | 20.4 | 30.0000 |
| S8 | Aspheric | −11.4413 | 0.4721 | | | 30.0000 |
| S9 | Aspheric | 4.5064 | 0.2884 | 1.55 | 56.1 | −34.8158 |
| S10 | Aspheric | 35.7917 | 0.6618 | | | −49.0000 |
| S11 | Aspheric | 10.3259 | 0.3293 | 1.55 | 56.1 | 3.9549 |
| S12 | Aspheric | 1.0482 | 0.3394 | | | −14.1974 |
| S13 | Spherical | Infinite | 0.1100 | 1.52 | 64.2 | |
| S14 | Spherical | Infinite | 0.0927 | | | |
| S15 | Spherical | Infinite | | | | |

As can be seen from Table 16, in example 6, the object-side surface and the image-side surface of any one of the first lens E1 to the sixth lens E6 are aspheric. Table 17 shows high-order coefficients applicable to each aspheric surface in example 6, wherein the surface shape of each aspheric surface may be defined by the formula (1) given in the above example 1.

TABLE 17

| Surface number | A4 | A6 | A8 | A10 | A12 |
|---|---|---|---|---|---|
| S1 | 3.3650E−03 | 1.3747E−01 | −9.3792E−01 | 3.9146E+00 | −9.5721E+00 |
| S2 | −1.0326E−01 | 1.8402E−01 | −1.4596E+00 | 6.2299E+00 | −1.5331E+01 |
| S3 | −1.2466E−01 | 3.6690E−01 | −4.5734E−01 | 1.1701E+00 | −2.7572E+00 |
| S4 | −8.5220E−02 | 5.3204E−01 | −8.5641E−01 | 2.4177E+00 | −4.3724E+00 |
| S5 | −2.6983E−01 | 6.6583E−01 | −5.1852E+00 | 3.0382E+01 | −1.2274E+02 |
| S6 | −2.9139E−01 | 1.7440E+00 | −1.4921E+01 | 7.7597E+01 | −2.5443E+02 |
| S7 | −3.6120E−01 | 5.8420E−01 | −3.8484E+00 | 1.7503E+01 | −5.4035E+01 |
| S8 | −3.4126E−01 | 6.9795E−01 | −4.1464E+00 | 1.5993E+01 | −3.8046E+01 |
| S9 | −4.7080E−02 | −1.1960E−01 | −4.3440E−02 | 2.8654E−01 | −8.6943E−01 |
| S10 | 5.3410E−03 | −1.2476E−01 | 2.6629E−01 | −5.4498E−01 | 5.6258E−01 |
| S11 | −7.4212E−01 | 8.7022E−01 | −5.7663E−01 | 2.4049E−01 | −6.4930E−02 |
| S12 | −2.2066E−01 | 1.2786E−01 | −3.9780E−02 | 5.6220E−03 | 5.3400E−04 |

TABLE 17-continued

| Surface number | A14 | A16 | A18 | A20 |
|---|---|---|---|---|
| S1 | 1.3390E+01 | −9.9283E+00 | 2.9586E+00 | 0.0000E+00 |
| S2 | 2.1526E+01 | −1.6180E+01 | 5.0957E+00 | 0.0000E+00 |
| S3 | 3.7770E+00 | −2.6159E+00 | 9.2812E−01 | 0.0000E+00 |
| S4 | 3.2020E+00 | 0.0000E+00 | 0.0000E+00 | 0.0000E+00 |
| S5 | 3.1663E+02 | −4.9888E+02 | 4.3061E+02 | −1.5468E+02 |
| S6 | 5.2292E+02 | −6.5361E+02 | 4.5194E+02 | −1.3150E+02 |
| S7 | 1.0853E+02 | −1.3206E+02 | 8.8624E+01 | −2.5212E+01 |
| S8 | 5.5798E+01 | −4.7629E+01 | 2.1551E+01 | −3.9995E+00 |
| S9 | 1.1202E+00 | −6.7527E−01 | 1.9424E−01 | −2.1710E−02 |
| S10 | −3.0835E−01 | 9.4028E−02 | −1.5220E−02 | 1.0250E−03 |
| S11 | 1.1361E−02 | −1.2500E−03 | 7.8400E−05 | −2.2000E−06 |
| S12 | −4.3000E−04 | 8.9300E−05 | −8.4000E−06 | 3.0300E−07 |

Table 18 shows effective focal lengths f1 to f6 of respective lens, a total effective focal length f of the optical imaging lens assembly, a distance TTL along the optical axis from the object-side surface S1 of the first lens E1 to the imaging plane S15, and half of a diagonal length ImgH of an effective pixel area on the imaging plane S15 in example 6.

TABLE 18

| f1 (mm) | 2.98 |
|---|---|
| f2 (mm) | −8.86 |
| f3 (mm) | −154.48 |
| f4 (mm) | 23.88 |
| f5 (mm) | 9.41 |
| f6 (mm) | −2.16 |
| f (mm) | 3.73 |
| TTL (mm) | 3.95 |
| ImgH (mm) | 3.32 |

Figure 12A:
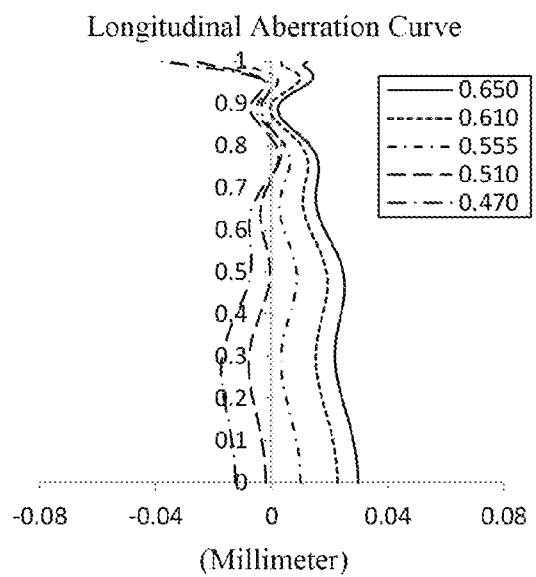
FIGS. 12A to 12D illustrate a longitudinal aberration curve, an astigmatic curve, a distortion curve, and a lateral color curve of the optical imaging lens assembly of the example 6, respectively.
Figure 12B:
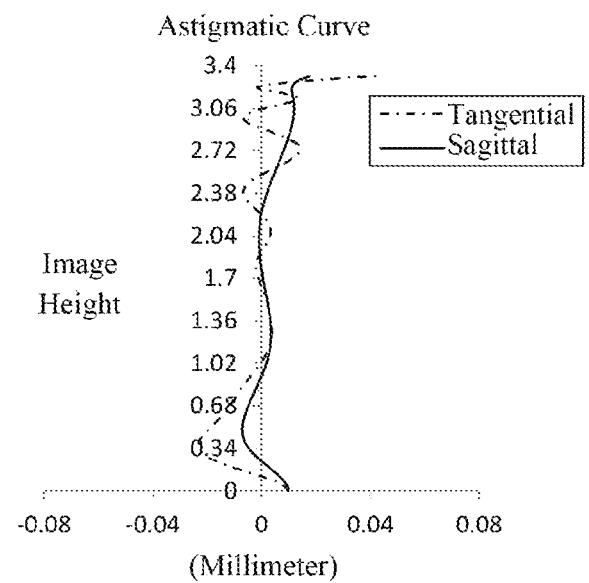
Figure 12C:
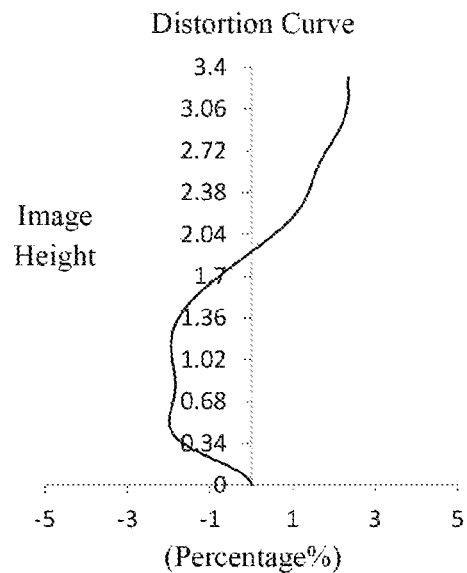
Figure 12D:
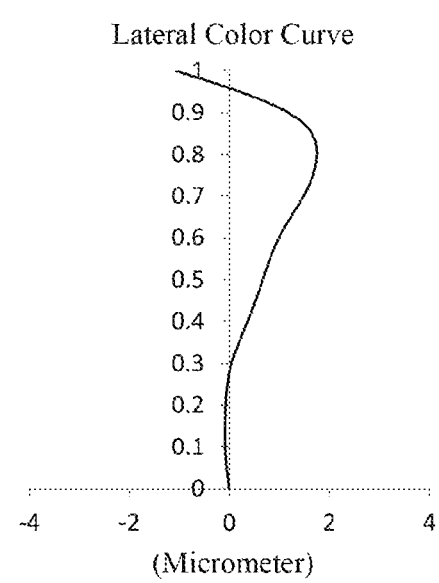

FIG. 12A illustrates a longitudinal aberration curve of the optical imaging lens assembly according to example 6, representing deviations of focal points converged by light of different wavelengths after passing through the lens assembly. FIG. 12B illustrates an astigmatic curve of the optical imaging lens assembly according to example 6, representing a curvature of a tangential plane and a curvature of a sagittal plane. FIG. 12C illustrates a distortion curve of the optical imaging lens assembly according to example 6, representing amounts of distortion corresponding to different image heights. FIG. 12D illustrates a lateral color curve of the optical imaging lens assembly according to example 6, representing deviations of different image heights on an imaging plane after light passes through the lens assembly. It can be seen from FIG. 12A to FIG. 12D that the optical imaging lens assembly provided in example 6 may achieve good image quality.

EXAMPLE 7

Figure 13:
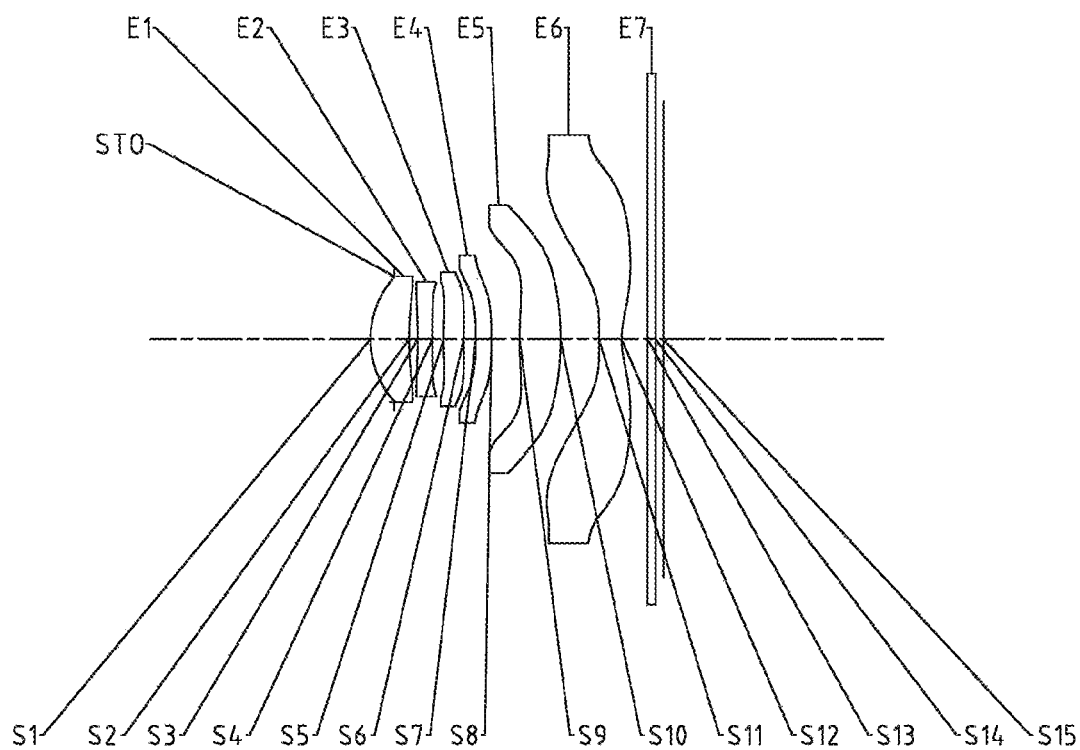
FIG. 13 illustrates a schematic structural view of an optical imaging lens assembly according to example 7 of the present disclosure.

An optical imaging lens assembly according to example 7 of the present disclosure is described below with reference to FIG. 13 to FIG. 14D. FIG. 13 shows a schematic structural view of the optical imaging lens assembly according to example 7 of the present disclosure.

As shown in FIG. 13, the optical imaging lens assembly according to an exemplary embodiment of the present disclosure includes a stop STO, a first lens E1, a second lens E2, a third lens E3, a fourth lens E4, a fifth lens E5, a sixth lens E6, an optical filter E7 and an imaging plane S15, which are sequentially arranged from an object side to an image side along an optical axis.

The first lens E1 has positive refractive power, an object-side surface S1 thereof is a convex surface, and an image-side surface S2 thereof is a concave surface. The second lens E2 has negative refractive power, an object-side surface S3 thereof is a concave surface, and an image-side surface S4 thereof is a concave surface. The third lens E3 has positive refractive power, an object-side surface S5 thereof is a convex surface, and an image-side surface S6 thereof is a concave surface. The fourth lens E4 has negative refractive power, an object-side surface S7 thereof is a concave surface, and an image-side surface S8 thereof is a convex surface. The fifth lens E5 has positive refractive power, an object-side surface S9 thereof is a convex surface, and an image-side surface S10 thereof is a convex surface. The sixth lens E6 has negative refractive power, an object-side surface S11 thereof is a convex surface, and an image-side surface S12 thereof is a concave surface. The optical filter E7 has an object-side surface S13 and an image-side surface S14. Light from an object sequentially passes through the respective surfaces S1 to S14 and is finally imaged on the imaging plane S15.

Table 19 shows surface type, radius of curvature, thickness, material and conic coefficient of each lens of the optical imaging lens assembly in example 7, wherein the units for the radius of curvature and the thickness are millimeter (mm).

TABLE 19

| Surface number | Surface type | Radius of curvature | Thickness | Material | | Conic coefficient |
|---|---|---|---|---|---|---|
| | | | | Refractive index | Abbe number | |
| OBJ | Spherical | Infinite | Infinite | | | |
| STO | Spherical | Infinite | −0.3235 | | | |
| S1 | Aspheric | 1.2669 | 0.5254 | 1.55 | 56.1 | −0.1569 |
| S2 | Aspheric | 3.8997 | 0.1183 | | | 0.0000 |
| S3 | Aspheric | −10.4006 | 0.2000 | 1.68 | 19.2 | 0.0000 |
| S4 | Aspheric | 22.5511 | 0.1546 | | | 0.0000 |
| S5 | Aspheric | 6.0544 | 0.2726 | 1.55 | 56.1 | −18.6476 |

TABLE 19-continued

| Surface number | Surface type | Radius of curvature | Thickness | Material Refractive index | Abbe number | Conic coefficient |
|---|---|---|---|---|---|---|
| S6 | Aspheric | 20.0432 | 0.1640 | | | 24.3480 |
| S7 | Aspheric | −6.4713 | 0.2130 | 1.67 | 20.4 | −40.3007 |
| S8 | Aspheric | −10.4882 | 0.3849 | | | 30.0000 |
| S9 | Aspheric | 5.3104 | 0.5589 | 1.55 | 56.1 | −38.4011 |
| S10 | Aspheric | −3.9432 | 0.5219 | | | −40.2340 |
| S11 | Aspheric | 13.5423 | 0.3097 | 1.55 | 56.1 | 2.6804 |
| S12 | Aspheric | 1.1302 | 0.3530 | | | −9.1228 |
| S13 | Spherical | Infinite | 0.1100 | 1.52 | 64.2 | |
| S14 | Spherical | Infinite | 0.1063 | | | |
| S15 | Spherical | Infinite | | | | |

As can be seen from Table 19, in example 7, the object-side surface and the image-side surface of any one of the first lens E1 to the sixth lens E6 are aspheric. Table 20 shows high-order coefficients applicable to each aspheric surface in example 7, wherein the surface shape of each aspheric surface may be defined by the formula (1) given in the above example 1.

TABLE 20

| Surface number | A4 | A6 | A8 | A10 | A12 |
|---|---|---|---|---|---|
| S1 | 1.4390E−03 | 1.5989E−01 | −8.3745E−01 | 2.8822E+00 | −6.2263E+00 |
| S2 | −5.7180E−02 | 7.2918E−02 | −1.2766E+00 | 8.1552E+00 | −2.7926E+01 |
| S3 | −9.4380E−02 | 4.3660E−01 | −1.7051E+00 | 8.2498E+00 | −2.5191E+01 |
| S4 | −6.9220E−02 | 4.1079E−01 | −3.8453E−01 | 1.0195E+00 | −2.1874E+00 |
| S5 | −2.6786E−01 | 1.4517E+00 | −1.4076E+01 | 8.5212E+01 | −3.3016E+02 |
| S6 | −1.8848E−01 | 3.9952E−01 | −3.3688E+00 | 1.6331E+01 | −5.2758E+01 |
| S7 | −3.6939E−01 | 3.4692E−01 | −9.8845E−01 | 2.7017E+00 | −6.2123E+00 |
| S8 | −3.2714E−01 | 1.9418E−01 | −8.9610E−02 | 2.3553E−01 | −1.4575E+00 |
| S9 | −9.8330E−02 | 1.2087E−01 | −4.7467E−01 | 8.8973E−01 | −1.0458E+00 |
| S10 | −1.0037E−01 | 1.3748E−01 | −1.9568E−01 | 2.2893E−01 | −2.0682E−01 |
| S11 | −7.4686E−01 | 8.6089E−01 | −5.6588E−01 | 2.3644E−01 | −6.4430E−02 |
| S12 | −2.5404E−01 | 2.1410E−01 | −1.0655E−01 | 3.3167E−02 | −6.5500E−03 |

| Surface number | A14 | A16 | A18 | A20 |
|---|---|---|---|---|
| S1 | 8.2310E+00 | −6.0653E+00 | 1.8100E+00 | 0.0000E+00 |
| S2 | 5.2379E+01 | −5.1512E+01 | 2.0768E+01 | 0.0000E+00 |
| S3 | 4.4234E+01 | −4.1421E+01 | 1.6239E+01 | 0.0000E+00 |
| S4 | 2.0232E+00 | 0.0000E+00 | 0.0000E+00 | 0.0000E+00 |
| S5 | 8.0664E+02 | −1.2025E+03 | 9.9398E+02 | −3.4723E+02 |
| S6 | 1.0861E+02 | −1.3707E+02 | 9.6088E+01 | −2.8220E+01 |
| S7 | 1.1378E+01 | −1.2987E+01 | 8.1916E+00 | −2.2437E+00 |
| S8 | 3.8288E+00 | −4.2916E+00 | 2.1869E+00 | −4.2225E−01 |
| S9 | 7.2590E−01 | −2.8441E−01 | 5.8533E−02 | −4.9500E−03 |
| S10 | 1.1657E−01 | −3.7386E−02 | 6.2650E−03 | −4.3000E−04 |
| S11 | 1.1432E−02 | −1.2761E−03 | 8.1500E−05 | −2.3000E−06 |
| S12 | 7.9700E−04 | −5.5808E−05 | 1.9600E−06 | −2.4000E−08 |

Table 21 shows effective focal lengths f1 to f6 of respective lens, a total effective focal length f of the optical imaging lens assembly, a distance TTL along the optical axis from the object-side surface S1 of the first lens E1 to the imaging plane S15, and half of a diagonal length ImgH of an effective pixel area on the imaging plane S15 in example 7.

TABLE 21

| | |
|---|---|
| f1 (mm) | 3.21 |
| f2 (mm) | −10.48 |
| f3 (mm) | 15.78 |
| f4 (mm) | −25.90 |
| f5 (mm) | 4.24 |

TABLE 21-continued

| | |
|---|---|
| f6 (mm) | −2.28 |
| f (mm) | 3.27 |
| TTL (mm) | 3.99 |
| ImgH (mm) | 3.23 |

Figures 14A, 14B:
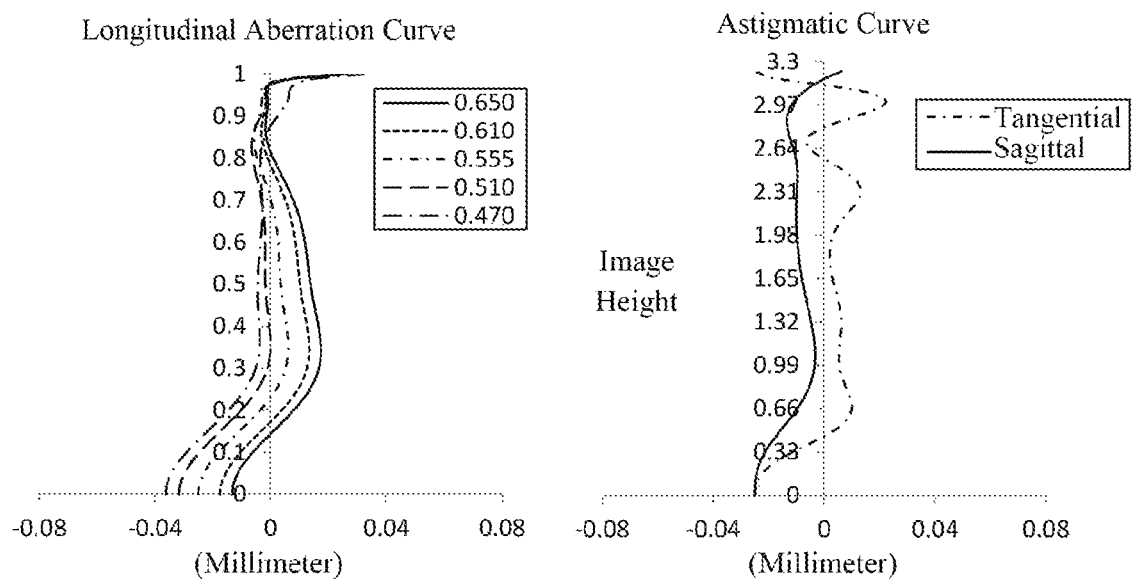
FIGS. 14A to 14D illustrate a longitudinal aberration curve, an astigmatic curve, a distortion curve, and a lateral color curve of the optical imaging lens assembly of the example 7, respectively.
Figures 14C, 14D:
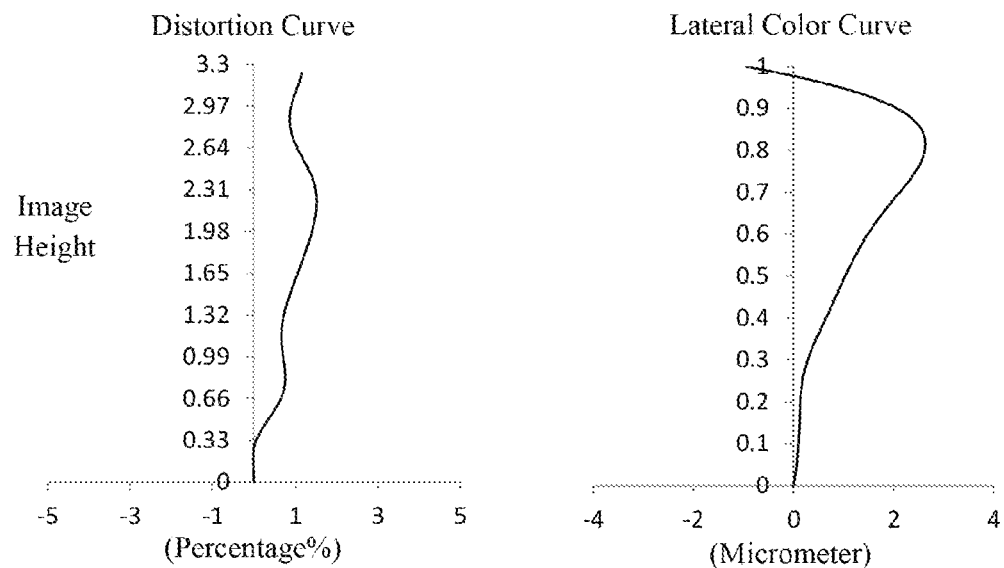

FIG. 14A illustrates a longitudinal aberration curve of the optical imaging lens assembly according to example 7, representing deviations of focal points converged by light of different wavelengths after passing through the lens assembly. FIG. 14B illustrates an astigmatic curve of the optical imaging lens assembly according to example 7, representing a curvature of a tangential plane and a curvature of a sagittal plane. FIG. 14C illustrates a distortion curve of the optical imaging lens assembly according to example 7, representing amounts of distortion corresponding to different image heights. FIG. 14D illustrates a lateral color curve of the optical imaging lens assembly according to example 7, representing deviations of different image heights on an imaging plane after light passes through the lens assembly.

It can be seen from FIG. 14A to FIG. 14D that the optical imaging lens assembly provided in example 7 may achieve good image quality.

EXAMPLE 8

Figure 15:
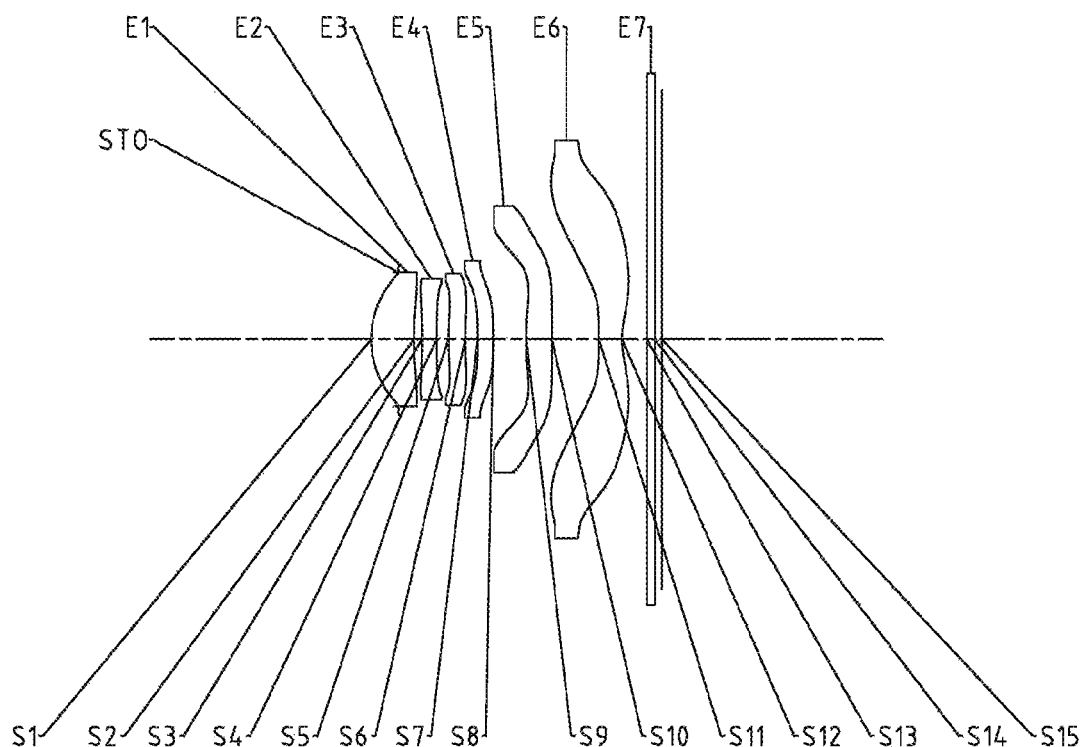
FIG. 15 illustrates a schematic structural view of an optical imaging lens assembly according to example 8 of the present disclosure.

An optical imaging lens assembly according to example 8 of the present disclosure is described below with reference to FIG. 15 to FIG. 16D. FIG. 15 shows a schematic structural view of the optical imaging lens assembly according to example 8 of the present disclosure.

As shown in FIG. 15, the optical imaging lens assembly according to an exemplary embodiment of the present disclosure includes a stop STO, a first lens E1, a second lens E2, a third lens E3, a fourth lens E4, a fifth lens E5, a sixth lens E6, an optical filter E7 and an imaging plane S15, which are sequentially arranged from an object side to an image side along an optical axis.

The first lens E1 has positive refractive power, an object-side surface S1 thereof is a convex surface, and an image-side surface S2 thereof is a concave surface. The second lens E2 has negative refractive power, an object-side surface S3 thereof is a concave surface, and an image-side surface S4 thereof is a concave surface. The third lens E3 has positive refractive power, an object-side surface S5 thereof is a convex surface, and an image-side surface S6 thereof is a concave surface. The fourth lens E4 has positive refractive power, an object-side surface S7 thereof is a concave surface, and an image-side surface S8 thereof is a convex surface. The fifth lens E5 has positive refractive power, an object-side surface S9 thereof is a convex surface, and an image-side surface S10 thereof is a convex surface. The sixth lens E6 has negative refractive power, an object-side surface S11 thereof is a convex surface, and an image-side surface S12 thereof is a concave surface. The optical filter E7 has an object-side surface S13 and an image-side surface S14. Light from an object sequentially passes through the respective surfaces S1 to S14 and is finally imaged on the imaging plane S15.

Table 22 shows surface type, radius of curvature, thickness, material and conic coefficient of each lens of the optical imaging lens assembly in example 8, wherein the units for the radius of curvature and the thickness are millimeter (mm).

TABLE 22

| Surface number | Surface type | Radius of curvature | Thickness | Material Refractive index | Abbe number | Conic coefficient |
|---|---|---|---|---|---|---|
| OBJ | Spherical | Infinite | Infinite | | | |
| STO | Spherical | Infinite | −0.3708 | | | |
| S1 | Aspheric | 1.2518 | 0.5824 | 1.55 | 56.1 | −0.1814 |
| S2 | Aspheric | 4.5135 | 0.1082 | | | 0.0000 |
| S3 | Aspheric | −9.5893 | 0.2000 | 1.68 | 19.2 | 0.0000 |
| S4 | Aspheric | 11.8919 | 0.1600 | | | 0.0000 |
| S5 | Aspheric | 4.0787 | 0.2299 | 1.55 | 56.1 | −28.3106 |
| S6 | Aspheric | 4.7812 | 0.1656 | | | −33.5853 |
| S7 | Aspheric | −32.8897 | 0.2100 | 1.67 | 20.4 | 30.0000 |
| S8 | Aspheric | −19.8256 | 0.4513 | | | 30.0000 |
| S9 | Aspheric | 3.9105 | 0.3484 | 1.55 | 56.1 | −35.2503 |
| S10 | Aspheric | −67.2934 | 0.6379 | | | −49.0000 |
| S11 | Aspheric | 11.4891 | 0.3149 | 1.55 | 56.1 | 6.0338 |
| S12 | Aspheric | 1.0454 | 0.3391 | | | −13.5676 |
| S13 | Spherical | Infinite | 0.1100 | 1.52 | 64.2 | |
| S14 | Spherical | Infinite | 0.0924 | | | |
| S15 | Spherical | Infinite | | | | |

As can be seen from Table 22, in example 8, the object-side surface and the image-side surface of any one of the first lens E1 to the sixth lens E6 are aspheric. Table 23 shows high-order coefficients applicable to each aspheric surface in example 8, wherein the surface shape of each aspheric surface may be defined by the formula (1) given in the above example 1.

TABLE 23

| Surface number | A4 | A6 | A8 | A10 | A12 |
|---|---|---|---|---|---|
| S1 | 2.3160E−03 | 1.4714E−01 | −9.3732E−01 | 3.6705E+00 | −8.5065E+00 |
| S2 | −7.4590E−02 | 1.3426E−01 | −9.7656E−01 | 3.9849E+00 | −9.8694E+00 |
| S3 | −7.6050E−02 | 2.8164E−01 | 1.4406E−01 | −2.3626E+00 | 7.6254E+00 |
| S4 | −7.4980E−02 | 5.0897E−01 | −7.8443E−01 | 1.6652E+00 | −2.6415E+00 |
| S5 | −2.6564E−01 | 1.0995E+00 | −9.8545E+00 | 5.8306E+01 | −2.2826E+02 |
| S6 | −2.8932E−01 | 1.7052E+00 | −1.2941E+01 | 6.1478E+01 | −1.8845E+02 |
| S7 | −4.2309E−01 | 6.6598E−01 | −2.6374E+00 | 9.6951E+00 | −2.8445E+01 |
| S8 | −4.0857E−01 | 6.6719E−01 | −2.7544E+00 | 9.4040E+00 | −2.1268E+01 |
| S9 | −2.9280E−02 | −1.7479E−01 | 1.4620E−01 | −7.2326E−02 | −2.8273E−01 |
| S10 | 1.9245E−02 | −1.5443E−01 | 3.0123E−01 | −4.7980E−01 | 4.1935E−01 |
| S11 | −7.6098E−01 | 8.9584E−01 | −5.9347E−01 | 2.4703E−01 | −6.6490E−02 |
| S12 | −2.4159E−01 | 1.6071E−01 | −6.2590E−02 | 1.5574E−02 | −2.4900E−03 |

TABLE 23-continued

| Surface number | A14 | A16 | A18 | A20 |
|---|---|---|---|---|
| S1 | 1.1411E+01 | −8.1875E+00 | 2.3688E+00 | 0.0000E+00 |
| S2 | 1.3773E+01 | −1.0037E+01 | 2.9963E+00 | 0.0000E+00 |
| S3 | −1.2947E+01 | 1.1773E+01 | −4.2971E+00 | 0.0000E+00 |
| S4 | 2.0253E+00 | 0.0000E+00 | 0.0000E+00 | 0.0000E+00 |
| S5 | 5.6848E+02 | −8.6657E+02 | 7.3207E+02 | −2.6120E+02 |
| S6 | 3.6703E+02 | −4.3883E+02 | 2.9216E+02 | −8.2170E+01 |
| S7 | 5.9202E+01 | −7.6491E+01 | 5.4283E+01 | −1.6091E+01 |
| S8 | 3.0644E+01 | −2.5947E+01 | 1.1664E+01 | −2.1512E+00 |
| S9 | 4.8962E−01 | −3.0453E−01 | 8.5194E−02 | −9.0700E−03 |
| S10 | −2.0237E−01 | 5.5128E−02 | −8.0200E−03 | 4.8600E−04 |
| S11 | 1.1587E−02 | −1.2700E−03 | 7.8800E−05 | −2.1000E−06 |
| S12 | 2.0700E−04 | 9.0000E−07 | −1.5000E−06 | 7.2700E−08 |

Table 24 shows effective focal lengths f1 to f6 of respective lens, a total effective focal length f of the optical imaging lens assembly, a distance TTL along the optical axis from the object-side surface S1 of the first lens E1 to the imaging plane S15, and half of a diagonal length ImgH of an effective pixel area on the imaging plane S15 in example 8.

TABLE 24

| f1 (mm) | 2.98 |
|---|---|
| f2 (mm) | −7.81 |
| f3 (mm) | 45.58 |
| f4 (mm) | 74.41 |
| f5 (mm) | 6.78 |
| f6 (mm) | −2.13 |
| f (mm) | 3.63 |
| TTL (mm) | 3.95 |
| ImgH (mm) | 3.39 |

Figure 16A:
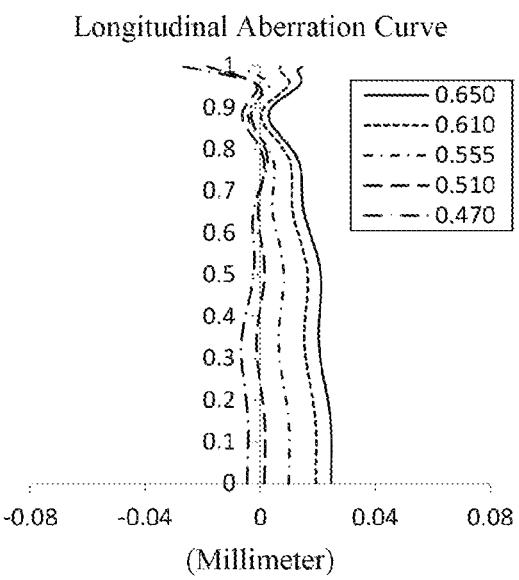
FIGS. 16A to 16D illustrate a longitudinal aberration curve, an astigmatic curve, a distortion curve, and a lateral color curve of the optical imaging lens assembly of the example 8, respectively.
Figure 16B:
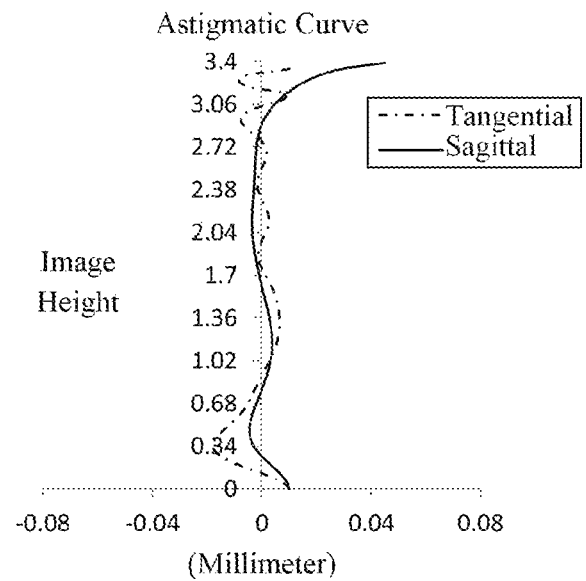
Figure 16C:
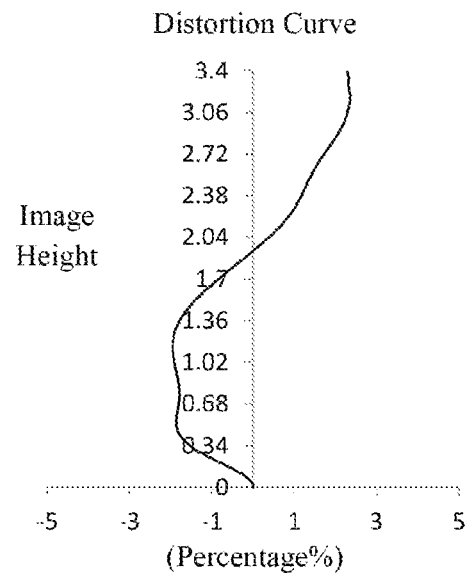
Figure 16D:
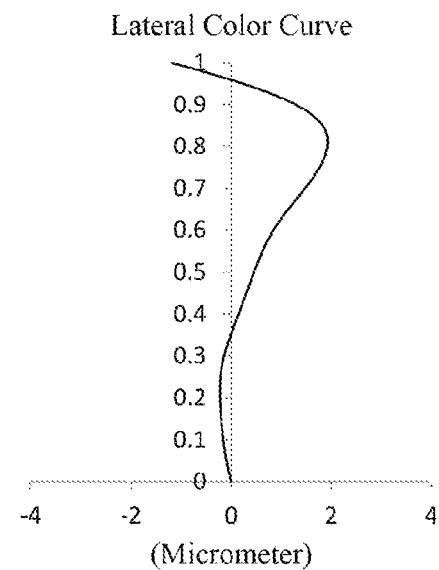

FIG. 16A illustrates a longitudinal aberration curve of the optical imaging lens assembly according to example 8, representing deviations of focal points converged by light of different wavelengths after passing through the lens assembly. FIG. 16B illustrates an astigmatic curve of the optical imaging lens assembly according to example 8, representing a curvature of a tangential plane and a curvature of a sagittal plane. FIG. 16C illustrates a distortion curve of the optical imaging lens assembly according to example 8, representing amounts of distortion corresponding to different image heights. FIG. 16D illustrates a lateral color curve of the optical imaging lens assembly according to example 8, representing deviations of different image heights on an imaging plane after light passes through the lens assembly. It can be seen from FIG. 16A to FIG. 16D that the optical imaging lens assembly provided in example 8 may achieve good image quality.

EXAMPLE 9

Figure 17:
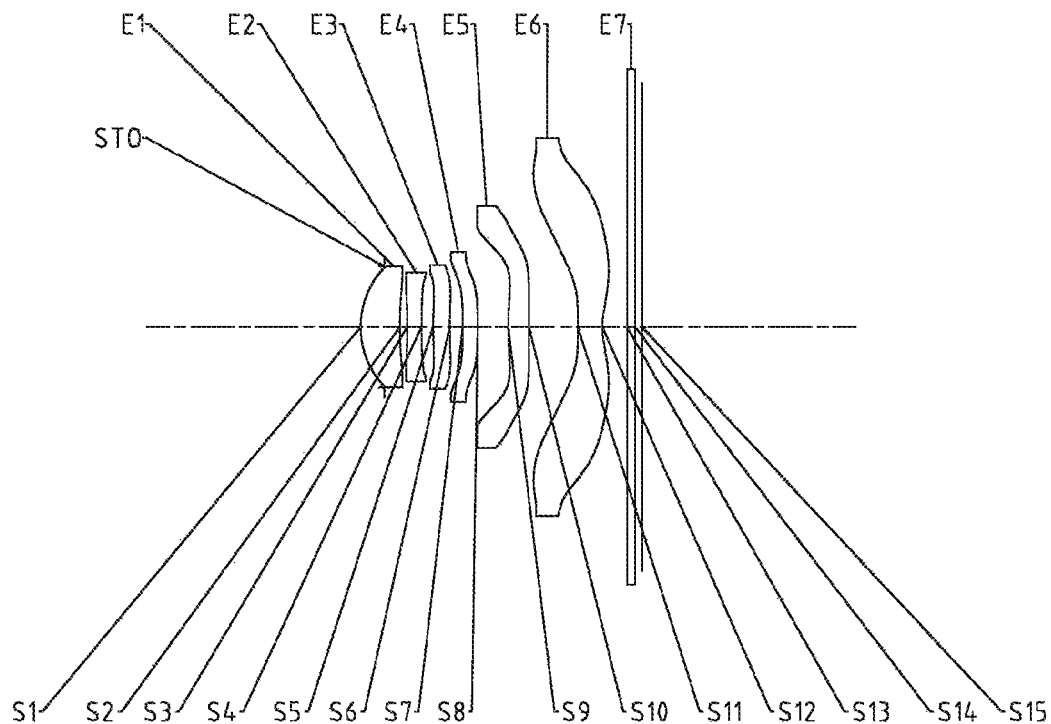
FIG. 17 illustrates a schematic structural view of an optical imaging lens assembly according to example 9 of the present disclosure.

An optical imaging lens assembly according to example 9 of the present disclosure is described below with reference to FIG. 17 to FIG. 18D. FIG. 17 shows a schematic structural view of the optical imaging lens assembly according to example 9 of the present disclosure.

As shown in FIG. 17, the optical imaging lens assembly according to an exemplary embodiment of the present disclosure includes a stop STO, a first lens E1, a second lens E2, a third lens E3, a fourth lens E4, a fifth lens E5, a sixth lens E6, an optical filter E7 and an imaging plane S15, which are sequentially arranged from an object side to an image side along an optical axis.

The first lens E1 has positive refractive power, an object-side surface S1 thereof is a convex surface, and an image-side surface S2 thereof is a concave surface. The second lens E2 has negative refractive power, an object-side surface S3 thereof is a concave surface, and an image-side surface S4 thereof is a concave surface. The third lens E3 has positive refractive power, an object-side surface S5 thereof is a convex surface, and an image-side surface S6 thereof is a concave surface. The fourth lens E4 has positive refractive power, an object-side surface S7 thereof is a concave surface, and an image-side surface S8 thereof is a convex surface. The fifth lens E5 has positive refractive power, an object-side surface S9 thereof is a convex surface, and an image-side surface S10 thereof is a concave surface. The sixth lens E6 has negative refractive power, an object-side surface S11 thereof is a convex surface, and an image-side surface S12 thereof is a concave surface. The optical filter E7 has an object-side surface S13 and an image-side surface S14. Light from an object sequentially passes through the respective surfaces S1 to S14 and is finally imaged on the imaging plane S15.

Table 25 shows surface type, radius of curvature, thickness, material and conic coefficient of each lens of the optical imaging lens assembly in example 9, wherein the units for the radius of curvature and the thickness are millimeter (mm).

TABLE 25

| Surface number | Surface type | Radius of curvature | Thickness | Material | | Conic coefficient |
|---|---|---|---|---|---|---|
| | | | | Refractive index | Abbe number | |
| OBJ | Spherical | Infinite | Infinite | | | |
| STO | Spherical | Infinite | −0.3354 | | | |
| S1 | Aspheric | 1.2054 | 0.5498 | 1.55 | 56.1 | −0.1826 |
| S2 | Aspheric | 4.2466 | 0.1053 | | | 0.0000 |
| S3 | Aspheric | −9.6950 | 0.2000 | 1.68 | 19.2 | 0.0000 |
| S4 | Aspheric | 11.2150 | 0.1632 | | | 0.0000 |
| S5 | Aspheric | 4.6921 | 0.2314 | 1.55 | 56.1 | −46.6949 |

TABLE 25-continued

| Surface number | Surface type | Radius of curvature | Thickness | Material Refractive index | Abbe number | Conic coefficient |
|---|---|---|---|---|---|---|
| S6 | Aspheric | 5.1387 | 0.1829 | | | −49.0000 |
| S7 | Aspheric | −40.3434 | 0.2100 | 1.67 | 20.4 | −49.0000 |
| S8 | Aspheric | −21.4014 | 0.4281 | | | 30.0000 |
| S9 | Aspheric | 4.0754 | 0.2904 | 1.55 | 56.1 | −42.0328 |
| S10 | Aspheric | 43.5656 | 0.6838 | | | −49.0000 |
| S11 | Aspheric | 10.3441 | 0.3462 | 1.55 | 56.1 | 4.3391 |
| S12 | Aspheric | 1.0743 | 0.3478 | | | −13.5194 |
| S13 | Spherical | Infinite | 0.1100 | 1.52 | 64.2 | |
| S14 | Spherical | Infinite | 0.1011 | | | |
| S15 | Spherical | Infinite | | | | |

As can be seen from Table 25, in example 9, the object-side surface and the image-side surface of any one of the first lens E1 to the sixth lens E6 are aspheric. Table 26 shows high-order coefficients applicable to each aspheric surface in example 9, wherein the surface shape of each aspheric surface may be defined by the formula (1) given in the above example 1.

TABLE 26

| Surface number | A4 | A6 | A8 | A10 | A12 |
|---|---|---|---|---|---|
| S1 | 1.2660E−02 | 6.1881E−02 | −4.0713E−01 | 1.9733E+00 | −5.6564E+00 |
| S2 | −9.1200E−02 | 1.4157E−01 | −1.3423E+00 | 6.8867E+00 | −2.0872E+01 |
| S3 | −9.9660E−02 | 4.1286E−01 | −6.8692E+00 | 2.2778E+01 | −7.2539E+00 |
| S4 | −8.0459E−02 | 6.5795E−01 | −1.1978E+00 | 3.1254E+00 | −5.4925E+00 |
| S5 | −2.7514E−01 | 8.7648E−01 | −8.4049E+00 | 5.5014E+01 | −2.3656E+02 |
| S6 | −2.6873E−01 | 1.1968E+00 | −9.8795E+00 | 5.0490E+01 | −1.6553E+02 |
| S7 | −3.9839E−01 | 5.1133E−01 | −2.5365E+00 | 1.1016E+01 | −3.5156E+01 |
| S8 | −4.0272E−01 | 6.3754E−01 | −2.9981E+00 | 1.0959E+01 | −2.6069E+01 |
| S9 | −5.4600E−02 | −1.5369E−01 | −7.2470E−02 | 6.4672E−01 | −1.8648E+00 |
| S10 | −9.2000E−03 | −1.4426E−01 | 3.7886E−01 | −7.8590E−01 | 8.2916E−01 |
| S11 | −7.5340E−01 | 9.1335E−01 | −6.2398E−01 | 2.6682E−01 | −7.3550E−02 |
| S12 | −2.4519E−01 | 1.6264E−01 | −6.2540E−02 | 1.4809E−02 | −2.0400E−03 |

| Surface number | A14 | A16 | A18 | A20 |
|---|---|---|---|---|
| S1 | 9.2082E+00 | −7.8911E+00 | 2.6388E+00 | 0.0000E+00 |
| S2 | 3.6080E+01 | −3.3266E+01 | 1.2740E+01 | 0.0000E+00 |
| S3 | 1.4051E+01 | −1.4223E+01 | 6.1708E+00 | 0.0000E+00 |
| S4 | 4.3271E+00 | 0.0000E+00 | 0.0000E+00 | 0.0000E+00 |
| S5 | 6.4203E+02 | −1.0645E+03 | 9.7695E+02 | −3.7840E+02 |
| S6 | 3.4367E+02 | −4.3736E+02 | 3.0932E+02 | −9.2138E+01 |
| S7 | 7.5630E+01 | −9.7594E+01 | 6.7837E+01 | −1.9548E+01 |
| S8 | 3.9420E+01 | −3.4973E+01 | 1.6455E+01 | −3.1737E+00 |
| S9 | 2.4215E+00 | −1.5430E+00 | 4.8041E−01 | −5.8840E−02 |
| S10 | −4.7080E−01 | 1.4961E−01 | −2.5300E−02 | 1.7840E−03 |
| S11 | 1.3102E−02 | −1.4600E−03 | 9.3000E−05 | −2.6000E−06 |
| S12 | 7.7500E−05 | 2.1400E−05 | −3.2000E−06 | 1.3100E−07 |

Table 27 shows effective focal lengths f1 to f6 of respective lens, a total effective focal length f of the optical imaging lens assembly, a distance TTL along the optical axis from the object-side surface S1 of the first lens E1 to the imaging plane S15, and half of a diagonal length ImgH of an effective pixel area on the imaging plane S15 in example 9.

TABLE 27

| f1 (mm) | 2.90 |
|---|---|
| f2 (mm) | −7.64 |
| f3 (mm) | 83.59 |
| f4 (mm) | 68.09 |
| f5 (mm) | 8.21 |

TABLE 27-continued

| f6 (mm) | −2.23 |
|---|---|
| f (mm) | 3.73 |
| TTL (mm) | 3.95 |
| ImgH (mm) | 3.40 |

Figure 18A:
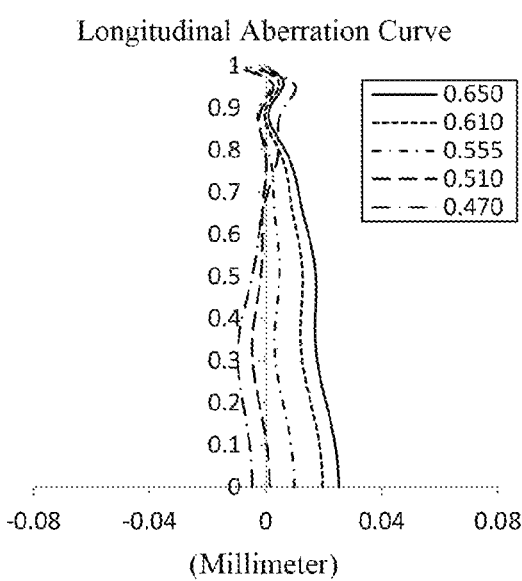
FIGS. 18A to 18D illustrate a longitudinal aberration curve, an astigmatic curve, a distortion curve, and a lateral color curve of the optical imaging lens assembly of the example 9, respectively.
Figure 18B:
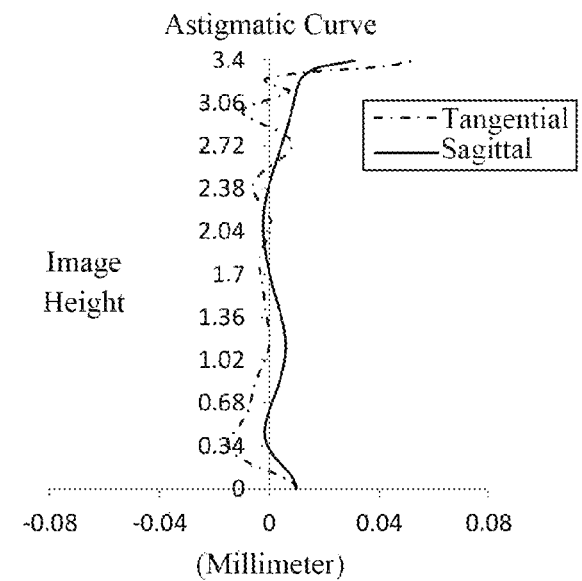
Figure 18C:
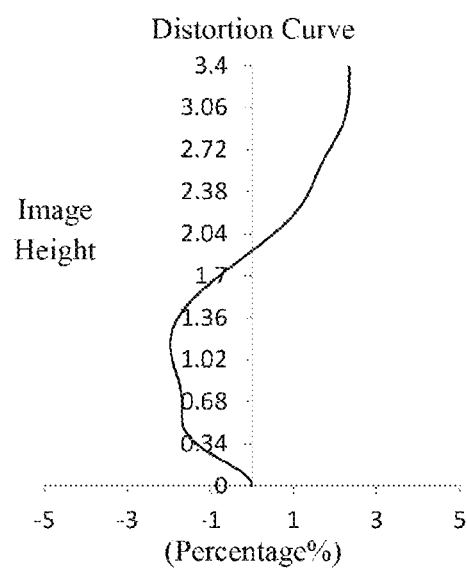
Figure 18D:
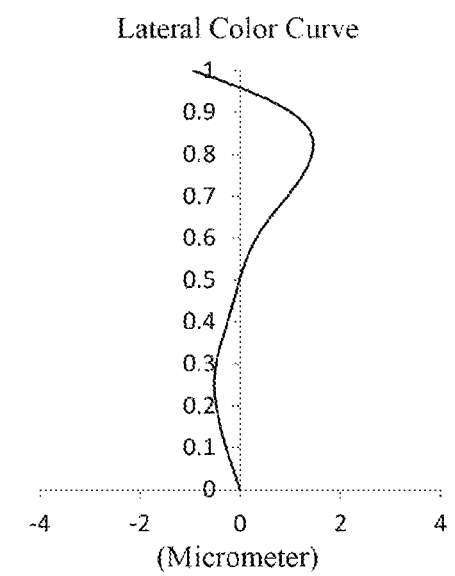

FIG. 18A illustrates a longitudinal aberration curve of the optical imaging lens assembly according to example 9, representing deviations of focal points converged by light of different wavelengths after passing through the lens assembly. FIG. 18B illustrates an astigmatic curve of the optical imaging lens assembly according to example 9, representing a curvature of a tangential plane and a curvature of a sagittal plane. FIG. 18C illustrates a distortion curve of the optical imaging lens assembly according to example 9, representing amounts of distortion corresponding to different image heights. FIG. 18D illustrates a lateral color curve of the optical imaging lens assembly according to example 9, representing deviations of different image heights on an imaging plane after light passes through the lens assembly.

It can be seen from FIG. 18A to FIG. 18D that the optical imaging lens assembly provided in example 9 may achieve good image quality.

In view of the above, examples 1 to 9 respectively satisfy the relationship shown in Table 28.

TABLE 28

| Conditional | Example | | | | | | | | |
|---|---|---|---|---|---|---|---|---|---|
| | 1 | 2 | 3 | 4 | 5 | 6 | 7 | 8 | 9 |
| TTL/ImgH | 1.23 | 1.22 | 1.20 | 1.21 | 1.14 | 1.19 | 1.24 | 1.17 | 1.16 |
| f5/f1 | 1.04 | 1.59 | 1.64 | 1.74 | 3.50 | 3.16 | 1.32 | 2.27 | 2.83 |
| (R2 − R1)/f | 1.01 | 1.02 | 0.98 | 0.76 | 0.71 | 0.81 | 0.80 | 0.90 | 0.81 |
| R4/f2 | −0.35 | −0.86 | −0.67 | −0.67 | −0.79 | −1.02 | −2.15 | −1.52 | −1.47 |
| |f6|/(CT5 + T56 + CT6) | 1.74 | 1.78 | 2.01 | 2.23 | 1.78 | 1.69 | 1.64 | 1.64 | 1.69 |
| ImgH/f | 0.97 | 0.93 | 0.95 | 0.94 | 0.93 | 0.89 | 0.99 | 0.93 | 0.91 |
| CT1/(CT2 + T23) | 0.98 | 1.31 | 1.30 | 1.31 | 1.52 | 1.56 | 1.48 | 1.62 | 1.51 |
| DT32/DT12 | 1.20 | 1.11 | 1.11 | 1.14 | 1.05 | 1.04 | 1.15 | 1.06 | 1.11 |
| (DT11 + DT61)/ImgH | 1.04 | 1.02 | 0.98 | 0.99 | 0.99 | 1.01 | 1.04 | 1.01 | 0.98 |
| f/|f3 + f4| | 0.31 | 0.09 | 0.16 | 0.01 | 0.19 | 0.03 | 0.32 | 0.03 | 0.02 |
| (R11 + R12)/(R11 − R12) | 1.08 | 1.07 | 1.12 | 1.25 | 1.27 | 1.23 | 1.18 | 1.20 | 1.23 |
| CT5/ET5 | 2.00 | 1.73 | 1.74 | 1.72 | 1.21 | 1.15 | 2.20 | 1.38 | 1.15 |
| (R7 + R9)/(R7 − R9) | 0.57 | 0.95 | 0.76 | 0.78 | 0.90 | 0.80 | 0.10 | 0.79 | 0.82 |

The present disclosure further provides an imaging apparatus, having an electronic photosensitive element which may be a photosensitive Charge-Coupled Device (CCD) or a Complementary Metal-Oxide Semiconductor (CMOS). The imaging apparatus may be an independent imaging device such as a digital camera, or may be an imaging module integrated in a mobile electronic device, such as a mobile phone. The imaging apparatus is equipped with the optical imaging lens assembly described above.

The foregoing is only a description of the preferred examples of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging lens assembly, sequentially from an object side to an image side along an optical axis, comprising: a first lens, a second lens, a third lens, a fourth lens, a fifth lens and a sixth lens, each of which has refractive power,
   wherein,
   an object-side surface of the first lens is a convex surface, and an image-side surface of the first lens is a concave surface;
   an image-side surface of the second lens is a concave surface; and
   an object-side surface of the sixth lens is a convex surface,
   wherein $1 \leq f5/f1 \leq 3.5$, and
   $TTL/ImgH \leq 1.3$,
   where f1 is an effective focal length of the first lens, f5 is an effective focal length of the fifth lens, TTL is a distance along the optical axis from the object-side surface of the first lens to an imaging plane of the optical imaging lens assembly, and ImgH is half of a diagonal length of an effective pixel area on the imaging plane of the optical imaging lens assembly.

2. The optical imaging lens assembly according to claim 1, wherein $0.6<(R2-R1)/f<1.1$,
   where R2 is a radius of curvature of the image-side surface of the first lens, R1 is a radius of curvature of the object-side surface of the first lens, and f is a total effective focal length of the optical imaging lens assembly.

3. The optical imaging lens assembly according to claim 1, wherein $-2.2<R4/f2<-0.3$,
   where R4 is a radius of curvature of the image-side surface of the second lens, and f2 is an effective focal length of the second lens.

4. The optical imaging lens assembly according to claim 1, wherein $1.4<|f6|/(CT5+T56+CT6)<2.4$,
   where f6 is an effective focal length of the sixth lens, CT5 is a center thickness of the fifth lens along the optical axis, T56 is a spaced interval between the fifth lens and the sixth lens along the optical axis, and CT6 is a center thickness of the sixth lens along the optical axis.

5. The optical imaging lens assembly according to claim 1, wherein $0.8<CT1/(CT2+T23)<1.8$,
   where CT1 is a center thickness of the first lens along the optical axis, CT2 is a center thickness of the second lens along the optical axis, and T23 is a spaced interval between the second lens and the third lens along the optical axis.

6. The optical imaging lens assembly according to claim 1, wherein $0.8<DT32/DT12<1.3$,
   where DT32 is a maximum effective radius of an image-side surface of the third lens, and DT12 is a maximum effective radius of the image-side surface of the first lens.

7. The optical imaging lens assembly according to claim 1, wherein $0.8<(DT11+DT61)/ImgH<1.2$,
   where DT11 is a maximum effective radius of the object-side surface of the first lens, DT61 is a maximum effective radius of the object-side surface of the sixth lens, and ImgH is half of the diagonal length of the effective pixel area on the imaging plane of the optical imaging lens assembly.

8. The optical imaging lens assembly according to claim 1, wherein $0<f/|3+f4|<0.5$,
   where f is a total effective focal length of the optical imaging lens assembly, f3 is an effective focal length of the third lens, and f4 is an effective focal length of the fourth lens.

9. The optical imaging lens assembly according to claim 1, wherein $0.9<(R11+R12)/(R11-R12)<1.4$,
where R11 is a radius of curvature of the object-side surface of the sixth lens, and R12 is a radius of curvature of an image-side surface of the sixth lens.

10. The optical imaging lens assembly according to claim 1, wherein $1.1<CT5/ET5<2.3$,
where CT5 is a center thickness of the fifth lens along the optical axis, and ET5 is an edge thickness of the fifth lens.

11. The optical imaging lens assembly according to claim 1, wherein $0<(R7+R9)/(R7-R9)<1$,
where R7 is a radius of curvature of an object-side surface of the fourth lens, and R9 is a radius of curvature of an object-side surface of the fifth lens.

12. The optical imaging lens assembly according to claim 1, wherein $0.7<ImgH/f<1.1$,
where ImgH is half of the diagonal length of the effective pixel area on the imaging plane of the optical imaging lens assembly, and f is a total effective focal length of the optical imaging lens assembly.

13. An optical imaging lens assembly, sequentially from an object side to an image side along an optical axis, comprising: a first lens, a second lens, a third lens, a fourth lens, a fifth lens and a sixth lens, each of which has refractive power,
wherein,
an object-side surface of the first lens is a convex surface, and an image-side surface of the first lens is a concave surface;
an image-side surface of the second lens is a concave surface; and
an object-side surface of the sixth lens is a convex surface, wherein $0.6<(R2-R1)/f<1.1$,
where R2 is a radius of curvature of the image-side surface of the first lens, R1 is a radius of curvature of the object-side surface of the first lens, and f is a total effective focal length of the optical imaging lens assembly, and
wherein $0<(R7+R9)/(R7-R9)<1$,
where R7 is a radius of curvature of an object-side surface of the fourth lens, and R9 is a radius of curvature of an object-side surface of the fifth lens.

14. The optical imaging lens assembly according to claim 13, wherein $1.4<|f6|/(CT5+T56+CT6)<2.4$,
where f6 is an effective focal length of the sixth lens, CT5 is a center thickness of the fifth lens along the optical axis, T56 is a spaced interval between the fifth lens and the sixth lens along the optical axis, and CT6 is a center thickness of the sixth lens along the optical axis.

15. The optical imaging lens assembly according to claim 14, wherein $0.9<(R11+R12)/(R11-R12)<1.4$,
where R11 is a radius of curvature of the object-side surface of the sixth lens, and R12 is a radius of curvature of an image-side surface of the sixth lens.

16. The optical imaging lens assembly according to claim 14, wherein $1.1<CT5/ET5<2.3$,
where CT5 is the center thickness of the fifth lens along the optical axis, and ET5 is an edge thickness of the fifth lens.

17. The optical imaging lens assembly according to claim 13, wherein $0.8<CT1/(CT2+T23)<1.8$,
where CT1 is a center thickness of the first lens along the optical axis, CT2 is a center thickness of the second lens along the optical axis, and T23 is a spaced interval between the second lens and the third lens along the optical axis.

18. The optical imaging lens assembly according to claim 13, wherein $0.8<DT32/DT12<1.3$,
where DT32 is a maximum effective radius of an image-side surface of the third lens, and DT12 is a maximum effective radius of the image-side surface of the first lens.

19. The optical imaging lens assembly according to claim 13, wherein $0.8<(DT11+DT61)/ImgH<1.2$,
where DT11 is a maximum effective radius of the object-side surface of the first lens, DT61 is a maximum effective radius of the object-side surface of the sixth lens, and ImgH is half of a diagonal length of an effective pixel area on an imaging plane of the optical imaging lens assembly.

* * * * *